United States Patent [19]
Rush, II et al.

[11] Patent Number: 5,003,933
[45] Date of Patent: Apr. 2, 1991

[54] INTEGRATED INDUCTION SYSTEM

[75] Inventors: William B. Rush, II, Clarkston; Jack E. Elder, Rochester; Richard K. Shier, Livonia; Jerry B. Foss, Farmington Hills, all of Mich.; Karl J. Haltiner, Jr., Pittsford; Grant M. Wheeler, Rochester, both of N.Y.

[73] Assignee: General Motors Corporation, Detroit, Mich.

[21] Appl. No.: 432,295

[22] Filed: Nov. 6, 1989

[51] Int. Cl.$^5$ ............................................. F02M 35/10
[52] U.S. Cl. .................. 123/52 MC; 123/519; 123/568; 123/572
[58] Field of Search ......... 123/52 M, 52 MB, 52 MC, 123/52 MV, 568, 572, 519

[56] References Cited

U.S. PATENT DOCUMENTS

| | | | |
|---|---|---|---|
| 3,776,209 | 12/1973 | Wertheimer et al. | 123/119 R |
| 3,869,859 | 3/1975 | Thornburgh | 60/305 |
| 3,949,715 | 4/1976 | Faix et al. | 123/52 MC |
| 4,111,163 | 9/1978 | Ederer et al. | 123/52 MV |
| 4,232,830 | 11/1980 | Casey et al. | 239/585 |
| 4,328,781 | 5/1982 | Morita | 123/570 |
| 4,341,186 | 7/1982 | Mayr et al. | 123/52 M |
| 4,440,120 | 4/1984 | Butler | 123/52 MV |
| 4,457,280 | 7/1984 | Hudson, Jr. | 123/470 |
| 4,463,711 | 8/1984 | Yoshioka | 123/52 MV |
| 4,475,486 | 10/1984 | Kessler | 123/52 M |
| 4,497,287 | 2/1985 | Schleiermacher et al. | 123/52 MC |
| 4,515,115 | 5/1985 | Okubo | 123/52 MB |
| 4,558,681 | 12/1985 | Mookerjee | 123/586 |
| 4,563,984 | 1/1986 | Ziegler et al. | 123/52 M |
| 4,586,477 | 5/1986 | Field et al. | 123/468 |
| 4,643,136 | 2/1987 | Ura et al. | 123/52 M |
| 4,643,138 | 2/1987 | Ruf et al. | 123/52 M |
| 4,686,944 | 8/1987 | Hiraoka et al. | 123/52 MV |
| 4,693,223 | 9/1987 | Eshleman et al. | 123/468 |
| 4,715,329 | 12/1987 | Yasuda et al. | 123/52 MV |
| 4,719,879 | 1/1988 | Kato et al. | 123/52 M |
| 4,726,329 | 2/1988 | Atkin | 123/52 MV |
| 4,765,286 | 8/1988 | Lyjak et al. | 123/52 MB |
| 4,776,313 | 10/1988 | Freismuth et al. | 123/470 |
| 4,798,187 | 1/1989 | Hudson, Jr. | 123/469 |
| 4,805,564 | 2/1989 | Hudson, Jr. | 123/52 MC |
| 4,805,575 | 2/1989 | de Concini et al. | 123/468 |
| 4,829,942 | 5/1989 | Ampferer | 123/52 MV |
| 4,867,110 | 9/1989 | Distelrath | 123/52 MC |

FOREIGN PATENT DOCUMENTS

88/03606 11/1986 World Int. Prop. O. .

OTHER PUBLICATIONS

AC Rochester Division, General Motors Corporation; "1989 New Product Information"; Publication No. 9D-1989; pp. 2, 16-21, 23-25, 27-29, 46; 1988; Rochester, NY.

*Primary Examiner*—David A. Okonsky
*Attorney, Agent, or Firm*—Gordon F. Belcher

[57] ABSTRACT

An integrated induction system for providing fluids to the cylinders in an engine comprises a casing adapted for mounting on the engine. The casing has an air inlet and a plurality of fluid outlets. A plurality of air tubes are disposed within the casing so that air entering the air inlet flows through the air tubes and respective fluid outlets to the cylinders. A fuel injection assembly is mounted within the casing to inject fuel into the air exiting the air tubes adjacent each of the fluid outlets causing a mixture of air and fuel to enter the respective cylinders. Connected to the fuel injection assembly is a carrier upon which are mounted induction system components. The casing is mounted on distribution mountings which are connected to the engine. The distribution mountings have passages to allow communication between air and fuel contained within the casing and the cylinders, and to allow communication between a supplemental fluid source and the cylinders.

20 Claims, 13 Drawing Sheets

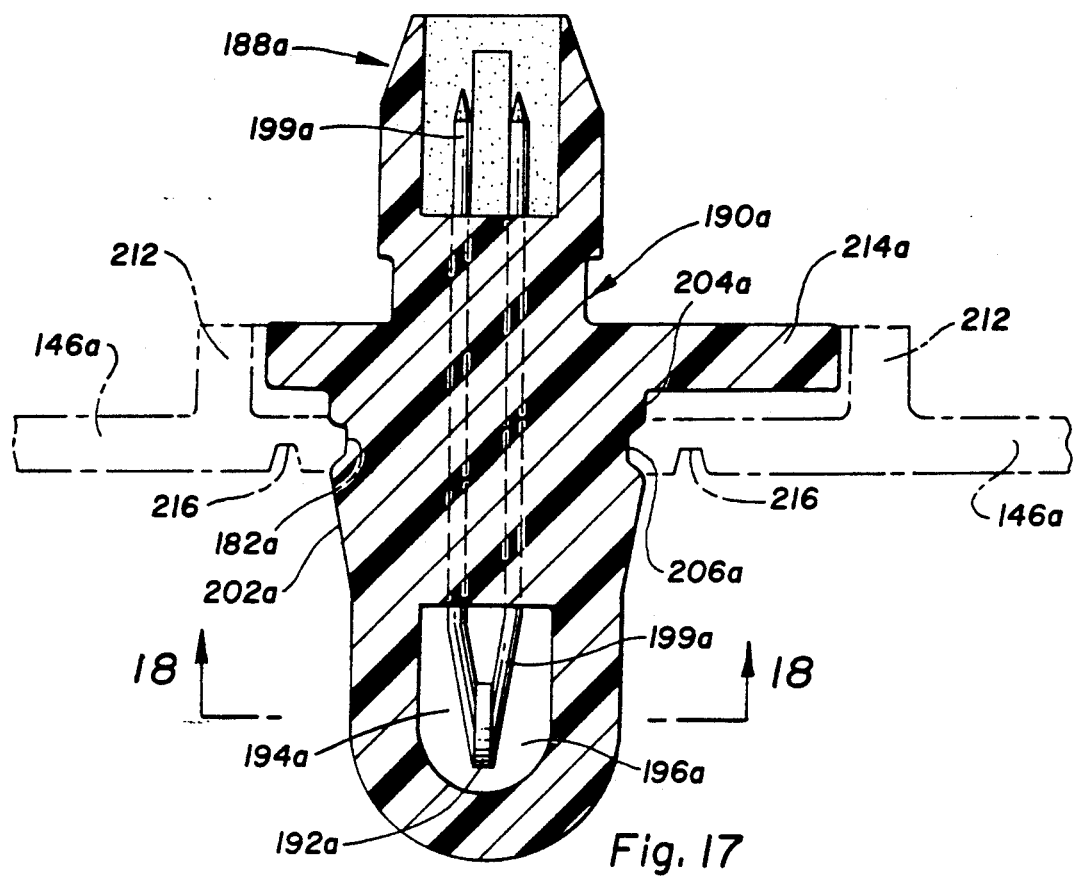
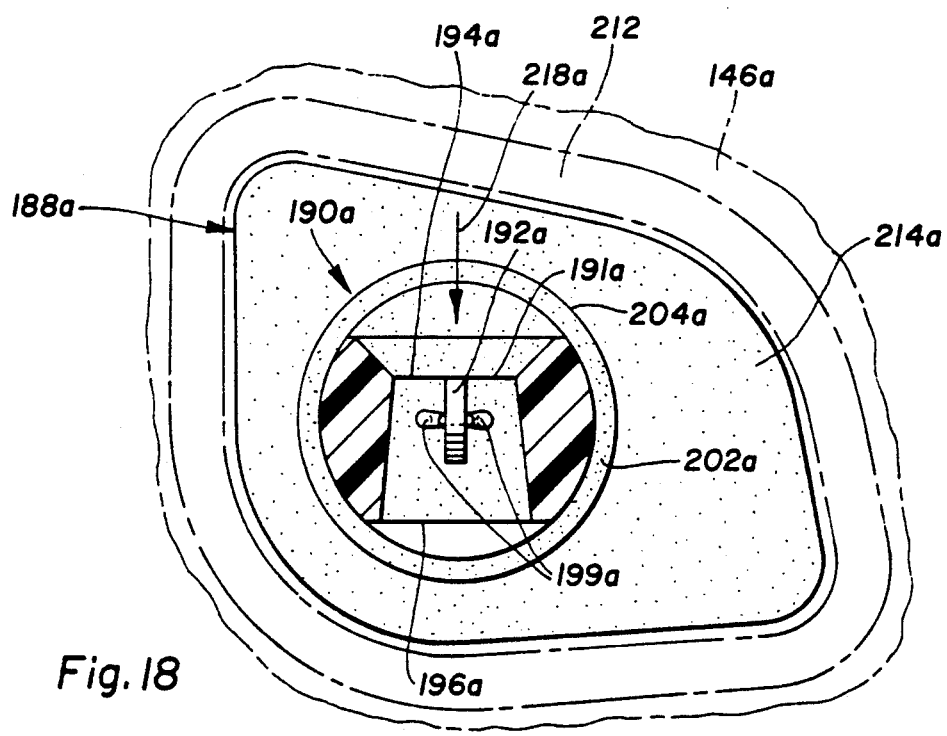
Fig. 17
Fig. 18

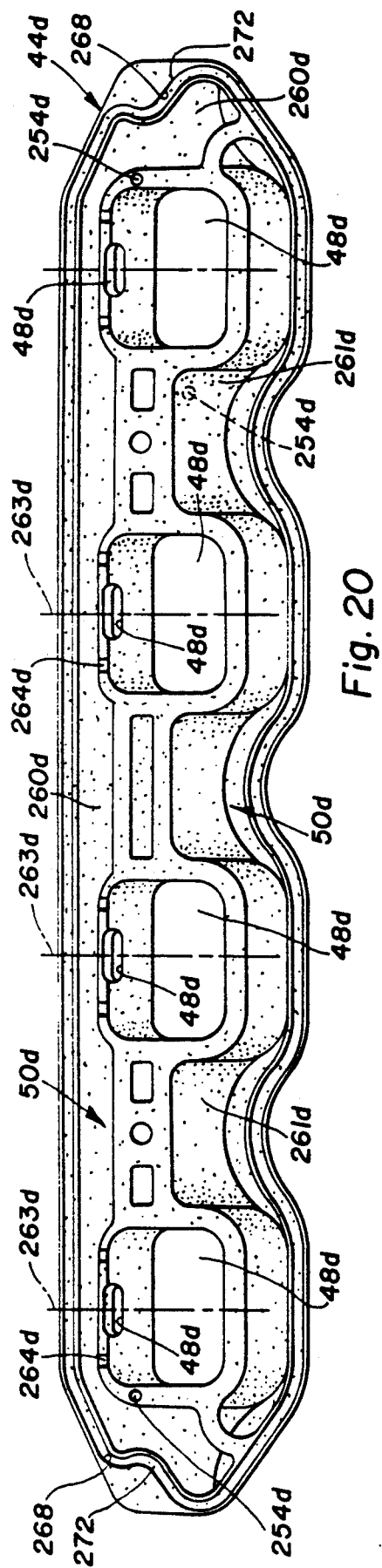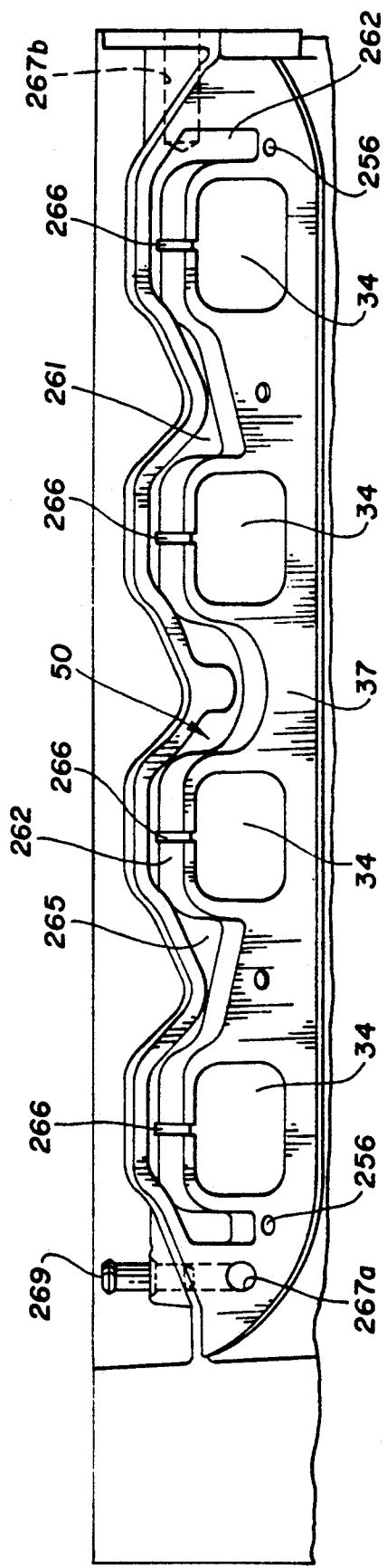
Fig. 20
Fig. 21

INTEGRATED INDUCTION SYSTEM

TECHNICAL FIELD

This invention relates to induction systems and, more particularly, to an integrated induction system for delivering fluids to the cylinders of an engine.

BACKGROUND

Intake manifolds commonly deliver air to the cylinders of an engine. Other fluids are typically delivered to the cylinders of an engine by systems connected to or separate from the intake manifold, such as fuel injection systems, exhaust gas recirculation systems, positive crankcase ventilation systems and fuel tank vapor systems. The components for these various systems are commonly assembled separately from the intake manifold and individually mounted on the engine or manifold.

Separate assembly of the intake manifold and the various fluid delivery system components can entail considerable difficulty and expense due to the interdependency of the various systems. Proper alignment, tight connections and fully coordinated control systems are often critical to the optimum functioning of the various systems. Such design and manufacturing requirements can be difficult to meet when separately assembling the various system assemblies and mounting them on an engine. For similar reasons, mounting the assembled components of these various systems as separate assemblies can also require substantial effort and expense.

The fluid delivery systems described above typically include many relatively small and fragile components as compared to other engine components such as blocks and cylinder heads Some of the components of the fluid delivery systems must be connected with similar components in other fluid delivery systems after their attachment to the engine. Engine assembly can therefore be made very complex due to the methods required to connect the components of the various fluid delivery systems to one another and to the engine as contrasted with the methods used to assemble the larger engine components.

Many of the fluid delivery system assemblies are often rigidly attached to the engine in close proximity to one another and have a number of rigid connections between the various components of the different systems. Therefore, access to one system assembly often requires the difficult disengagement of a number of rigid connections as well as removal of a number of components to gain access to the desired components.

SUMMARY OF THE INVENTION

The present invention provides an integrated induction system which contains in one assembly many of the components of the various fluid delivery systems of an engine which have heretofore been separately assembled and mounted on the engine.

In its simplest form, the integrated induction system comprises a casing adapted for mounting on the engine. The casing has an air inlet and a plurality of fluid outlets Each of the fluid outlets is adapted to communicate with a respective cylinder in the engine. A plurality of air tubes are disposed within the casing with the air tubes occupying a portion of the interior of the casing and the unoccupied portion of the casing constituting a plenum. The air tubes are positioned within the casing so that the plenum provides a flow path from the air inlet to the air tubes. One end of each of the air tubes opens from the plenum and the other end engages the casing adjacent one of the fluid outlets to allow communication between the plenum and the cylinders in the engine. Air entering into the plenum through the air inlet is thereby introduced via each of the air tubes into the respective cylinders. A fuel injection assembly is mounted within the casing to inject fuel into the air exiting the air tubes adjacent each of the fluid outlets to cause a mixture of air and fuel to enter the respective cylinders.

The integrated induction system may include a carrier to which the fuel injection assembly and other components which may be contained within the casing are connected. The integrated induction system may also include distribution mountings disposed between the casing and the engine. Each distribution mounting has mounting passages which allow communication between the interior of the casing and cylinders. Air and fuel inside of the casing is thereby able to enter the cylinders. Each distribution mounting also has distribution passages which allow communication between the cylinders and a supplemental fluid source located outside the casing. Supplemental fluids, such as exhaust gas, crankcase gas or fuel tank vapors, are thereby able to flow into the cylinders.

Containment of certain fluid delivery system components within a casing has a number of advantages. The casing can protect the fluid delivery system components contained within it. This allows the use of easily releasable connectors to connect the components inside the casing to one another and to the casing. The number of fasteners required is thereby reduced to facilitate assembly of the components. The casing also muffles the noise produced by the components contained within it reducing the sound produced by the engine.

Assembly of the integrated induction system is facilitated by containment of the fluid delivery system components within the casing. Alignment, connection and coordination of the various components can take place separate from the assembly of the other parts of the engine in an environment specifically designed to facilitate assembly of many of these small components. Testing of the various fluid delivery systems prior to attachment to the engine is also possible. The integrated induction system may then be mounted on the engine as a tested, single unit comparable in size to many of the other components typically handled during assembly of an engine.

These and other features and advantages of the invention will be more fully understood from the following description of certain specific embodiments of the invention taken together with the accompanying drawings.

BRIEF DRAWING DESCRIPTION

In the drawings:

FIG. 17 is an enlarged view corresponding to FIG. 14 showing a second embodiment of the temperature sensor (in solid lines) and portions of a second embodiment of the carrier (in phantom);

FIG. 18 is an enlarged cross-sectional view of the second embodiment of the temperature sensor generally in the plane indicated by line 18—18 of FIG. 17;

FIG. 20 is a view corresponding to FIG. 19 showing a second embodiment of a distribution mounting;

FIG. 21 is an enlarged plan view of a cylinder head in the plane indicated by line 21—21 of FIG. 2;

Corresponding reference characters indicate corresponding parts throughout the several view of the drawings.

DETAILED DESCRIPTION

Figure 1:
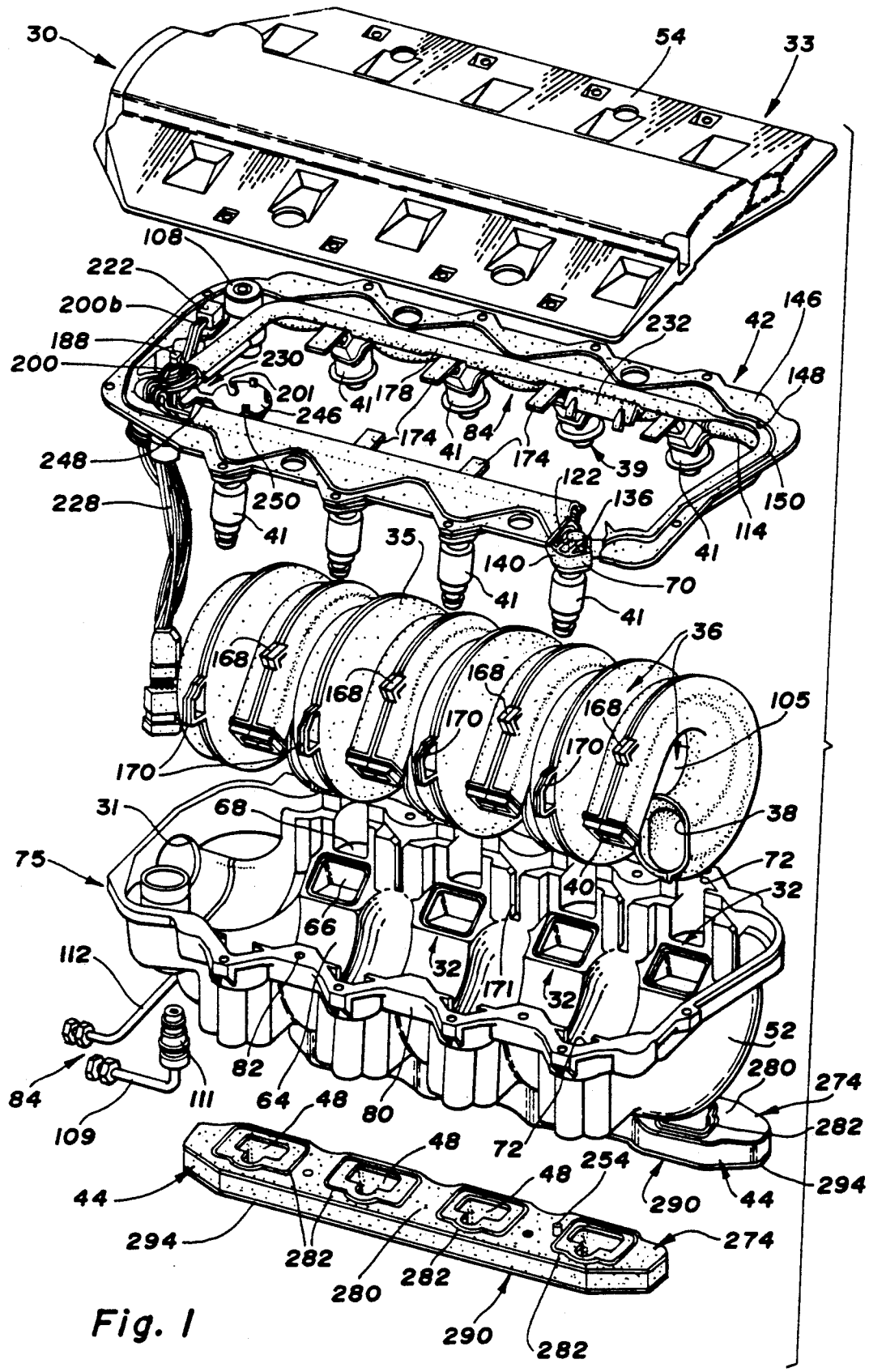
FIG. 1 is an exploded view of an integrated induction system in accordance with the present invention.

Referring now to FIGS. 1, 2, 3 and 4 of the drawings, numeral 30 generally indicates an integrated induction system of the present invention to provide air, fuel and other fluids to the cylinders in the engine. Briefly, the integrated induction system 30 comprises a casing 33, a plurality of air tubes 35 disposed within the casing and a fuel injection assembly 39 mounted within the casing. The casing 33 has an air inlet 31 enabling air to enter the casing and a plurality of fluid outlets 32 enabling fluids to exit the casing. The fluid outlets 32 are formed in the casing 33 so that, when the casing is mounted on the cylinder heads 37, each fluid outlet 32 communicates with a respective cylinder inlet 34.

The air tubes 35 occupy a portion of the interior volume of the casing 33 with the unoccupied portion of the casing constituting a plenum 36. The air tubes 35 are positioned in the casing 33 so that the plenum 36 provides a flow path from the air inlet 31 to the air tubes. One end of each air tube 35, constituting the air tube inlet 38, opens from the plenum 36. The other end of the air tube 35, constituting the air tube outlet 40, engages the casing 33 adjacent a respective fluid outlet 32 to allow communication between the plenum 36 and a respective cylinder. Air entering into the plenum 36 through the air inlet 31 is thereby introduced via each of the air tubes 35 into the respective cylinders.

The fuel injection assembly 39 includes fuel injectors 41 which inject fuel into the air exiting the air tubes 35 adjacent the fluid outlets 32 to cause a mixture of air and fuel to enter the respective cylinders. The integrated induction system 30 may also include a carrier 42 connected to the fuel injection assembly 39 and other components contained within the casing 33.

The casing 33 may be supported on distribution mountings 44 disposed between it and the cylinder heads 37. Each distribution mounting 44 has mounting passages 48 which allow communication between the casing and cylinders to enable the air and fuel inside the casing to enter the cylinders. Each distribution mounting 44 also has distribution passages 50 which allow communication between a supplemental fluid source located outside the casing 33 and the cylinders. Supplemental fluids, such as exhaust gas, crankcase gas or fuel vapors, are thereby able to flow into the cylinders.

Casing

Figure 2:
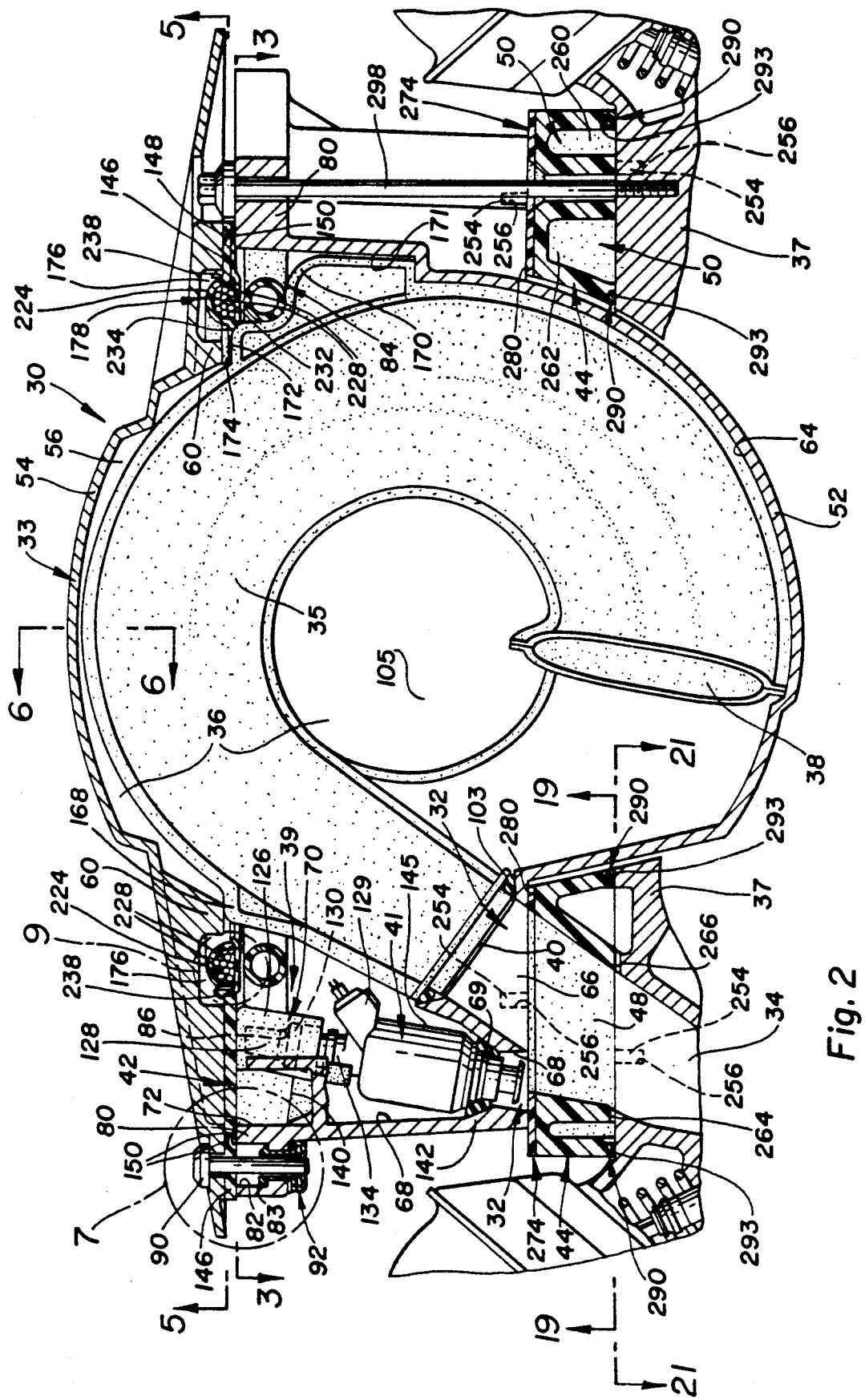
FIG. 2 is an enlarged transverse sectional view of the integrated induction system of FIG. 1 generally in a plane between air tubes showing some components in assembly.
Figure 4:
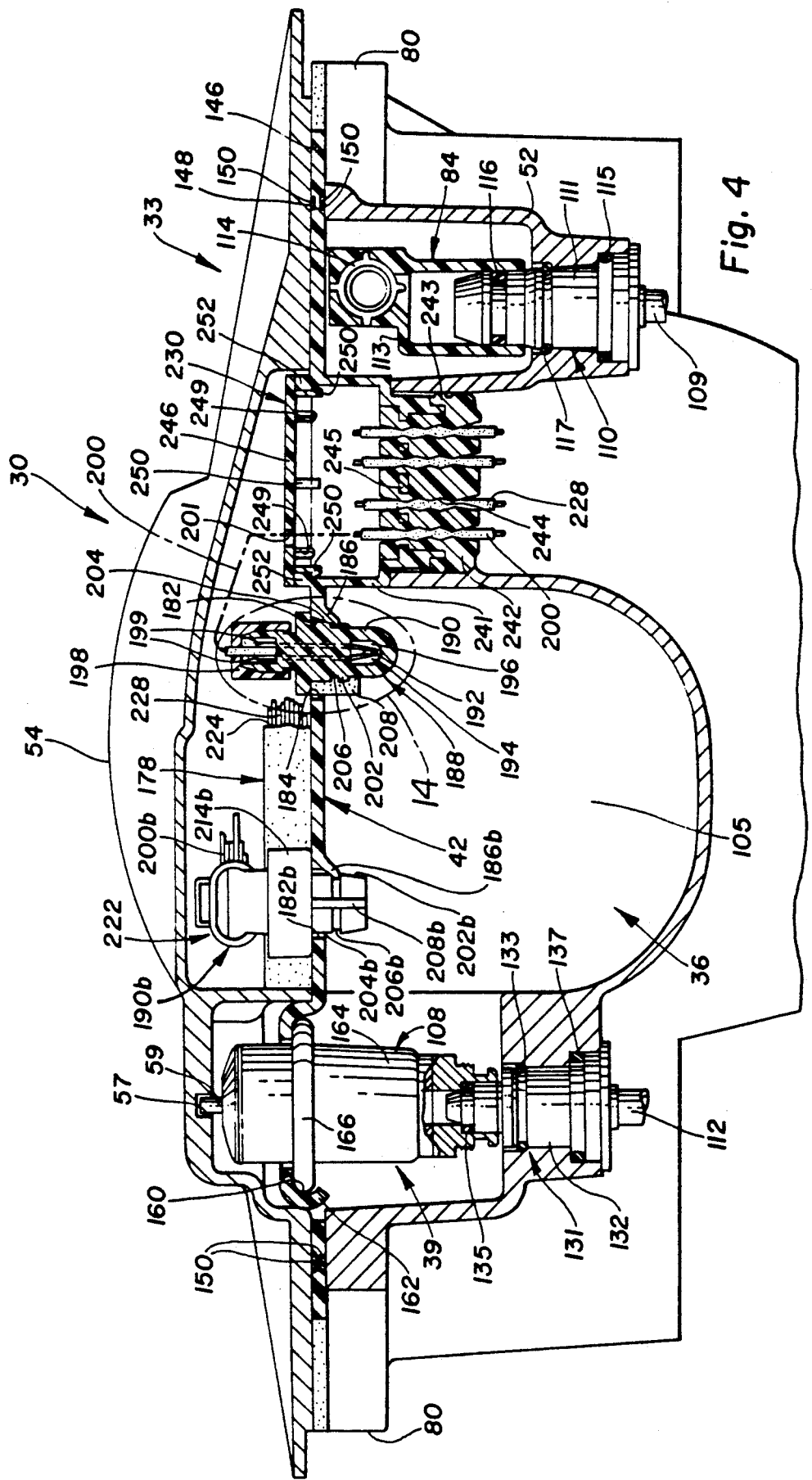
FIG. 4 is an enlarged sectional view generally in the plane indicated by line 4—4 of FIG. 3 showing some components connected to the carrier adjacent the air inlet.
Figure 5:
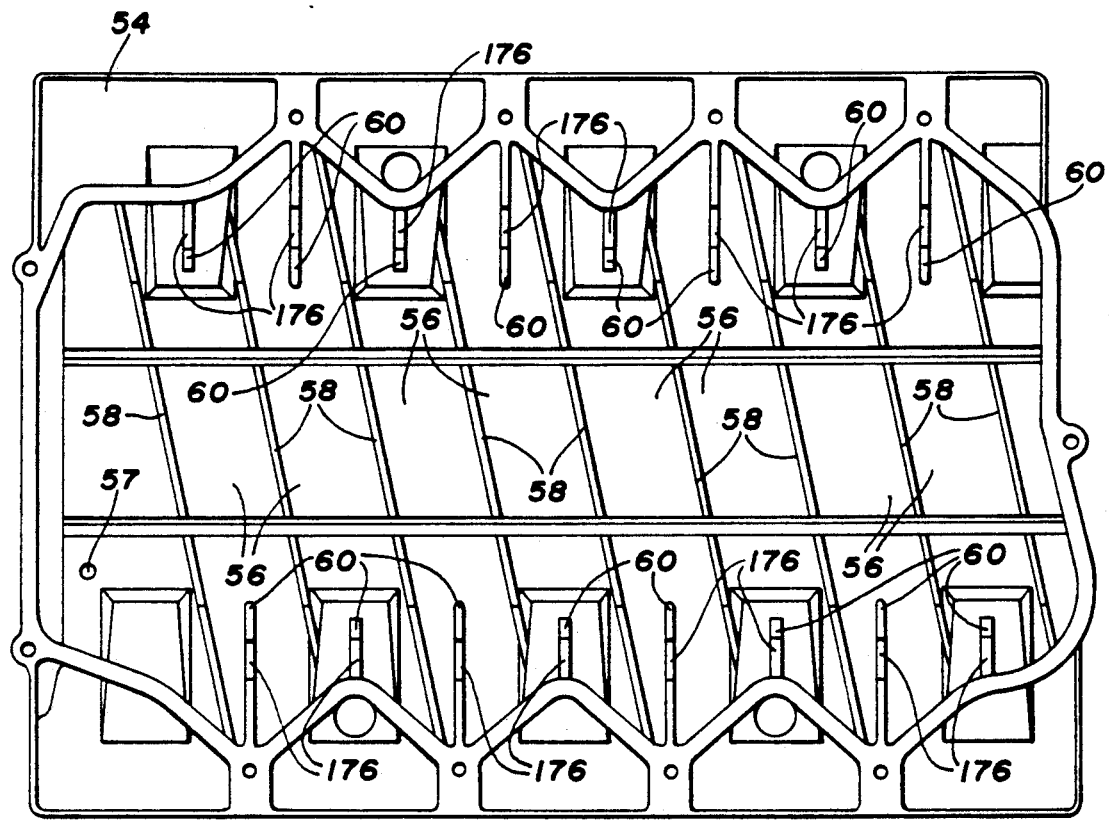
FIG. 5 is a view in the plane indicated by line 5—5 of FIG. 2 showing the bottom of the cover of the casing.

As shown in FIGS. 1 and 2, the casing 33 comprises an enclosure defined by a shell 52 and a cover 54. The cover 54 is removable to provide access to the interior of the casing 33. As shown in FIG. 5, the inner surface of the cover 54 has curved grooves 56 which are transverse to the axis of the shell 52 and correspond to each of the air tubes 35. The cover 54 has a cylindrical recess 57 in its bottom surface into which the vacuum inlet 59 of a fuel pressure regulator 108 extends, as shown in FIG. 4. The recess 57 is larger than the vacuum inlet 59 to allow the air inside the casing to communicate with the fuel pressure regulator 108.

Figure 6:
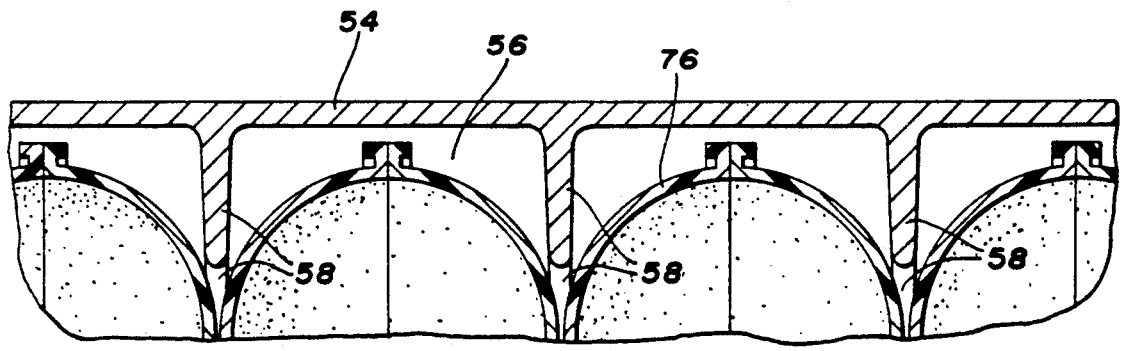
FIG. 6 is an enlarged cross-sectional view in the plane indicated by line 6—6 of FIG. 2 showing portions of the cover and air tubes.

The cover 54 has support ribs 58 and locator ribs 60 extending from the bottom surface, as shown in FIGS. 5 and 6. The support ribs 58 are located between the grooves 56 and have limited extension away from the cover 54 to avoid interference with the air tubes 35. The support ribs 58 and the locator ribs 60 strengthen the cover 54.

The upper surface of the cover may have U-shaped clasps to retain wires, such as spark plug wires, to the cover.

As shown in FIG. 1, the shell 52 has an air inlet 31 comprising an opening formed in one end of the shell adjacent its top. The outlet surface of the shell 52 adjacent the air inlet 31 is flat to enable a throttle body 62, shown in FIG. 3, or other air metering device to be mounted on it to regulate the flow of air into the casing 33.

The inner surface of the shell 52 has transverse grooves 64 similar to the grooves 56 in the cover 54. Each transverse groove 64 corresponds to one of the air tubes 35.

As shown in FIGS. 1 and 2, the shell 52 has fluid outlets 32 comprising openings formed in the bottom of the shell adjacent its sides. The fluid outlets 32 mate with respective mounting passages 48 to allow communication between the inside of the casing 33 and the cylinders. The inner rows of fluid outlets 32 allow communication between the air tubes 35 and the cylinders and constitute the air outlets 66. The outer rows of fluid outlets 32 allow communication between the fuel injectors 41 and the cylinders and are constituted by openings in injector seats 68. The injector seats 68 are shaped to support the outlet of each fuel injector 41 mounted within it. The shell 52 also has a pod socket 72 adjacent each injector seat 68 to provide a mounting for the fuel injection assembly 39.

As shown in FIG. 1, a casing flange 80 is formed in the sides of the shell 52 adjacent its upper edge to serve as a mounting for the cover 54. Locating the casing flanges 80 adjacent the top of the shell 52 facilitates the casting process used to fabricate the shell. As shown in FIGS. 1 and 2, each casing flange 80 has a plurality of connecting bores 82. Each connecting bore 82 has an enlarged upper portion, producing a step 83 for connection of a spring clip 92. Threaded connecting bolts 90 extend through openings in the cover 54 into each connecting bore 82. The spring clip 92 has internal threads corresponding to the external threads on the connecting bolts 90. This enables each connecting bolt 90 to be screwed into a respective spring clip 92 adjacent the casing flange 80 to hold the cover 54 against the shell 52.

The cover 54 and shell 52 are constructed of die cast magnesium using an AZ91HP alloy. The cover 54 and shell 52 may also be constructed of aluminum, plastic or other forms of magnesium. Forming the cover 54 and shell 52 of high strength material provides protection to the components contained in it.

Figure 7:
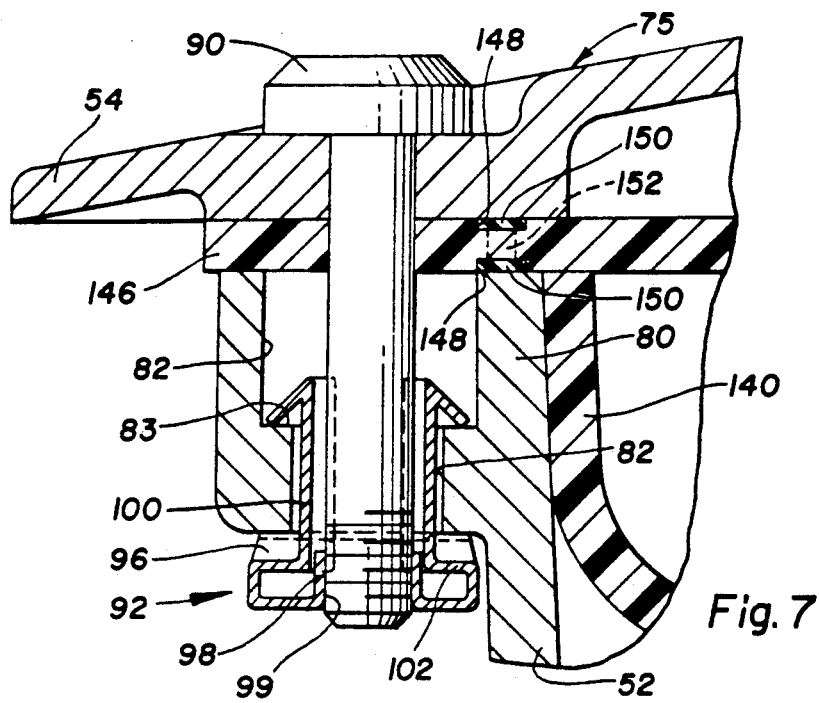
FIG. 7 is an enlarged view of circled portion 7 of FIG. 2 showing a spring clip.
Figure 8:
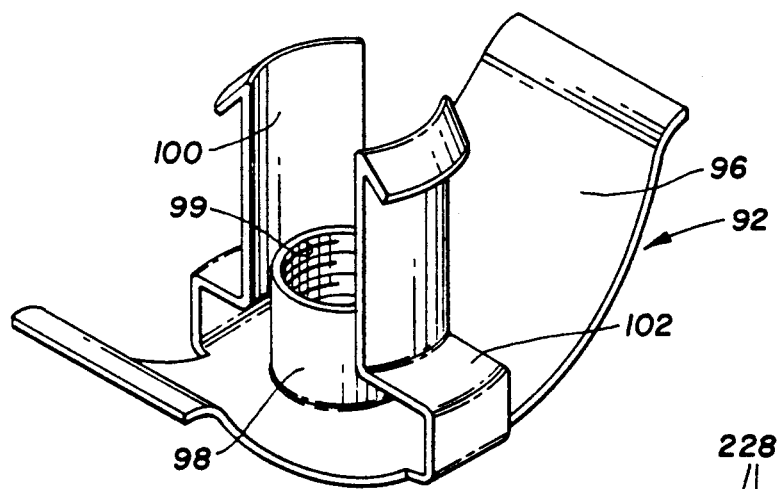
FIG. 8 is a perspective view of the spring clip of FIG. 7.

As shown in FIGS. 7 and 8, the spring clip 92 comprises a U-shaped resilient member 96 formed from a flat metal strip. The ends of the U-shaped member 96 engage the casing flange 80 on opposite sides of each connecting bore 82 so that the portion of the U-shaped member between its ends is spaced apart from the casing flange. A boss 98 with a clip bore 99 extends from the inner portion of the U-shaped member 96 in a radial direction so that the clip bore is coaxially aligned with the connecting bore 82. The clip bore 99 has internal threads which correspond to the external threads on the connecting bolts 90.

A pair of elongate clip members 100 extend upward from the inner portion of the U-shaped member 96 into the connecting bore 82. A portion of each clip member 100 is bent inward between its end and the U-shaped member 96 to form a stop 102. The end of each clip member 100 is hook shaped to grasp the step 83 to retain the clip 92 in alignment with respect to the connecting bore 82.

The connecting bolts 90 are inserted into openings in the cover 54 and connecting bores 82, and screwed into respective clip bores 99 to retain the cover 54 against the shell 52 when the pressure inside the casing 33 is below a predetermined limit. If the pressure inside the casing 33, however, reaches or exceeds the predetermined limit, the U-shaped member 96 deflects toward the casing flange 80 allowing the cover 54 to separate from the shell 52. The stop 102 engages the lower surface of the casing flange 80 thereby limiting the deflection of the U-shaped member 96.

Air Tubes

As shown in FIGS. 1 and 2, the air tubes 35 are located inside the casing 33 with the individual air tubes in side-to-side relation with respect to one another. The air tubes 35 are arranged so that their centers of curvature are approximately collinear. The inner curves of the air tubes 35 thereby define a cylindrical region constituting the principal portion 105 of the plenum 36. This arrangement of the air tubes 35 inside the casing 33 minimizes its size.

Figure 10:
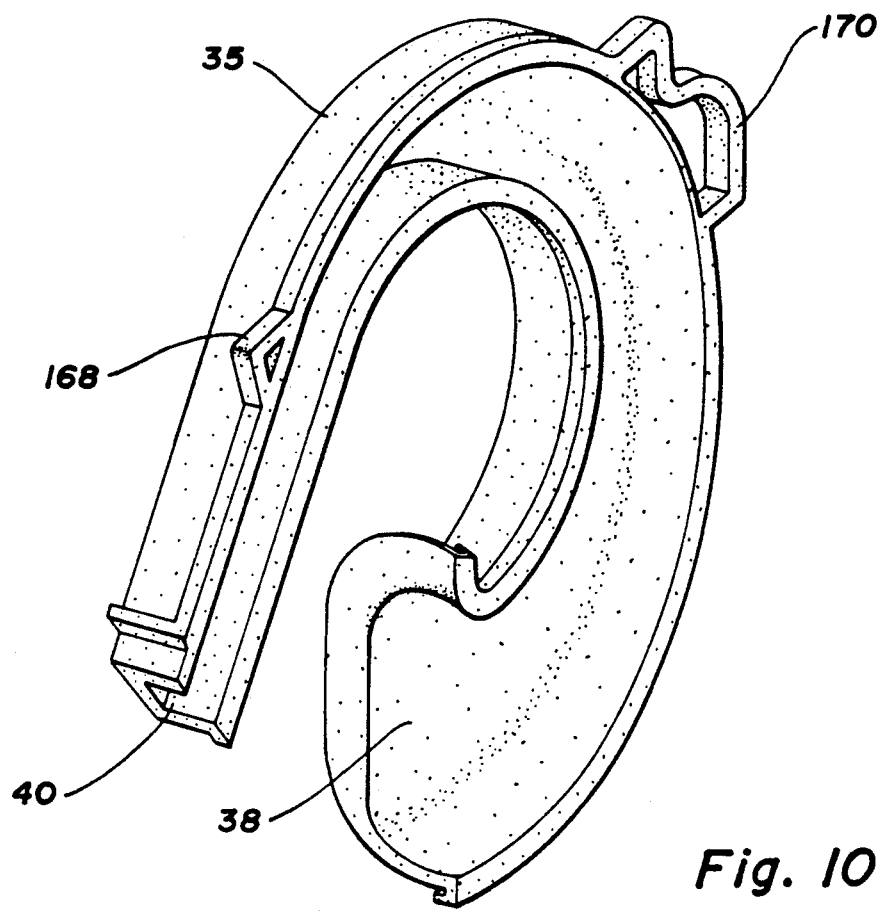
FIG. 10 is a perspective view of a half-section of an air tube shown in FIG. 1.

The air tubes 35 have a two-piece construction with one-half of one air tube being shown in FIG. 10. Air tubes 35 having one-piece construction are also possible. The air tubes 35 are constructed of glass and mineral reinforced nylon, and include type 66 nylon. The air tubes 35 may also be formed of metal (e.g., aluminum or magnesium), plastic (e.g., polyethylene or polypropylene) or other types of nylon.

The air tubes 35 are arranged so that the air tube inlets 38 are offset from one another to reduce interference between the air entering adjacent air tubes. Each air tube 35 is tuned to enhance charging of the cylinders by the air exiting the air tubes. The cross section of each air tube 35 decreases along its length from the air tube inlet 38 to the air tube outlet 40 to cause the velocity of the air passing through it to increase along its length. The tuning characteristics and cross section of the air tubes 35 can be varied to adjust the air flow into the cylinders.

A molded seal 103, constructed of dimethylsilicone, is compressed between each air tube 35 and the shell 52 adjacent the air tube outlet 40 to provide a seal between the air tube and shell. The seal 103 may also be formed of a thermoplastic elastomer or rubber composition.

Each air tube 35 has a locator system comprising an integral locator tab 168 projecting from its outer surface above the air tube outlet 40 and an integral locator tab 170 projecting from its outer surface on the opposite side of the air tube. A locator sleeve 171 is formed on the inner surface of the shell 52 adjacent each locator tab 170. When each air tube 35 is placed in the shell 52, each locator tab 170 enters in an adjacent locator sleeve 171. The locator tabs 170 and corresponding locator sleeves 171 are shaped to interlock with one another to hold the air tubes 35 in alignment with respect to the casing 33.

The carrier 42 has an extension 174 which rests on each locator tab 170 when the carrier is placed in the shell 52. Each extension 174 may have a resilient locator pad 172 formed on its lower surface which engages the respective locator tab 170. Each locator pad 172 is formed in the respective extension 174 by molding dimethylsilicone rubber into a cylindrical recess formed in its lower surface. Concentric circular beads are formed on the lower surface of each locator pad 172. Other types of locator pads may be disposed between each extension 174 and the respective locator tab 170.

When the cover 54 is attached to the shell 52, portions of the locator ribs 60 bear upon locator tabs 168 and the extensions 174 thereby pressing the air tubes 35 downward. This results in engagement of locator tab 170 with the bottom of locator sleeve 171 and compression of the seal 103. The locator pads 172 are also compressed between the respective extensions 174 and locator tabs 170 to frictionally resist relative movement between them and the extensions. Each locator rib 60 has a vertical recess 176 to allow each rib to arch over a conduit 178 formed in the carrier 42 and seat squarely with the locator tabs 168, extensions 174 and carrier. The outer curvature of the air tubes 35 may be less than the inner curvature of the casing 33 so that the air tubes are suspended from the locator tabs 168, 170 in the casing.

An alternate locator system for the air tubes 35 is possible comprising resilient locator pads attached to the upper surfaces of the air tubes by adhesive or the like. When the cover 54 is connected to the shell 52, the inner surface of the cover bears upon each locator pad to compress it between the cover and the respective air tube 35 to frictionally resist relative movement between it and the cover. The locator systems described above may be used with other casings which contain air tubes to maintain them in alignment inside the casing.

Fuel Injection Assembly

The fuel injection assembly 39 shown in FIGS. 1, 2, 3 and 4 includes the fuel injectors 41 and a fuel distribution assembly 84 which connects the fuel injectors and allows fuel to flow to each of them. The fuel distribution assembly 84 includes an injector pod 70 connected to each fuel injector 41 and fuel tubes 114 which serially connect the fuel injectors. The fuel tubes 114 are constructed of plastic, and include type 12 nylon.

Figure 12:
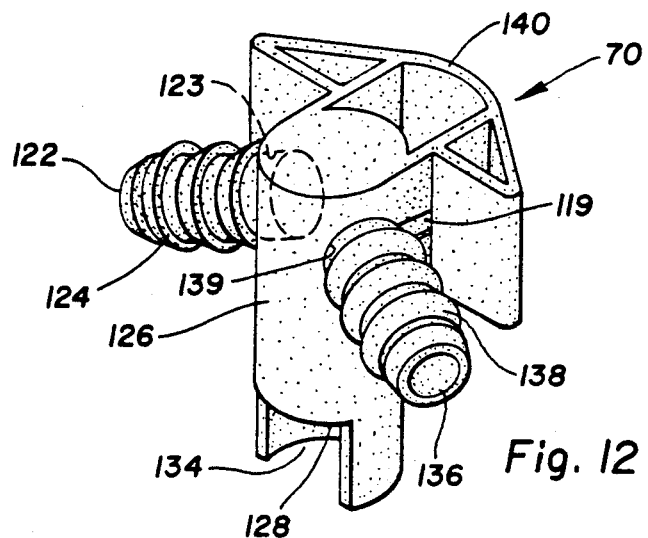
FIG. 12 is a perspective view of the injector pod shown in FIG. 11.

Each injector pod 70 is constructed of glass reinforced nylon and includes type 12 or 66 nylon. The injector pod 70 has a hollow injector mounting 126 as shown in FIGS. 2 and 12. The injector mounting 126 includes an integral injector socket 128 with a cross section which is larger than the cross section of the inlet of the fuel injectors 41 so that a fuel injector can be inserted into the socket. An O-ring 130 provides a seal between the fuel injector 41 and the injector mounting 126, and resists removal of the fuel injector from it. The walls of the injector socket 128 have a chamfered portion 86 adjacent the closed end of the injector socket. When the fuel injector 41 and O-ring 130 are inserted into the injector mounting 126, the O-ring engages the chamfered portion 86 which limits the travel of the fuel injector into the injector socket 128.

Each injector mounting 126 has an injector slot 134 adjacent its opening so that, when the fuel injector 41 is inserted in the injector socket 128, an electrical connector 129 extending from the side of the injector is received in the injector slot. The fuel injector 41 is thereby retained in a predetermined angular orientation with respect to the axis of the injector socket 128. Each injector mounting 126 also has an integral inlet ledge 118 and outlet ledge 119 on its outer surface.

Each injector pod 70 has an integral tubular inlet projection 122 extending away from the injector mounting 126 adjacent its inlet ledge 118. The inlet projection 122 registers with an inlet 123 on the injector mounting 126 to allow fuel to flow through the inlet projection into the injector socket 128 to supply the fuel injector 41 retained in it. The inlet projection 122 is inserted into the resilient opening in one end of a fuel tube 114. The inlet projection 122 has sufficiently thick exterior circumferential beads 124 to securely retain the fuel tube 114 to the inlet projection.

Each injector pod 70 has an integral tubular outlet projection 136 extending away from the injector mounting 126 adjacent its outlet ledge 119. The outlet projection 136 registers with an outlet 139 on the injector mounting 126 to allow excess fuel to be discharged from it through the outlet projection. The outlet projection 136 is inserted into the resilient opening in the end of another fuel tube 114. The outlet projection 136 has sufficiently thick exterior circumferential beads 138 to securely retain the fuel tube 114 to the outlet projection. The injector pod 70 includes an integral shoulder 140 having an eccentric cross section. Each pod socket 72 has a cross section corresponding to that of a shoulder 140. Each pod socket 72 is slightly larger than the corresponding shoulder 140 to enable each shoulder to be inserted into a pod socket. The small clearance between each shoulder 140 and the corresponding pod socket 72 results in resistance to rotation of the shoulder in the pod socket. This facilitates alignment of each fuel injector 41 with respect to the shell 52.

Insertion of each shoulder 140 in a corresponding pod socket 72, in combination with the receipt of the electrical connector 129 in the injector slot 134, enables each fuel injector 41 to be angularly aligned with respect to the shell 52. Since the shell 52 is fixed with respect to the cylinders, the fuel injectors 41 can be angularly aligned with respect to them. This enables a fuel injector having multiple fuel sprays, such as those used with cylinders having multiple intake ports, to be positioned so that each fuel spray is aimed directly into a respective cylinder intake port.

Each fuel injector 41 has a frustoconical seal ring 142 constructed of nitrile rubber to provide a seal between each fuel injector and the corresponding injector seat 68. The shape of the seal ring 142 enables it to limit the displacement of the fuel injector 41 through the opening in the injector seat 68. The limitations on displacement provided by the seal ring 142 and the chamfered portion 86 facilitate alignment of the fuel injector 41 in the injector seat 68. The seal ring 142 may have a cylindrical skirt to enhance the seal between each fuel injector 41 and the corresponding injector seat 68.

The injector pods 70 may be used with other fuel injection assemblies to connect fuel injectors to fuel tubes, and to a casing or other part of an engine. The injector pods 70 may also be used to hold fuel injectors in alignment with respect to cylinders.

The construction of the injector pods 70 and their connection to the fuel tubes 114 allows fuel to flow through the fuel tubes 114 into each injector pod 70 to supply the respective fuel injector 41 connected to it. The portion of the fuel in each injector pod 70 which does not flow into the associated fuel injector 41 is discharged from the injector pod and allowed to supply the adjacent injector pod. Fuel is thereby able to flow through the string of connected fuel injectors 41 to serially supply each of them.

The fuel distribution assembly 84 includes a fuel inlet tube 109 which extends through an opening in the shell 52 and a fuel inlet connector 110. The end of the fuel inlet tube 109 outside the casing 33 is connected to a fuel source and the other end is connected, via the fuel inlet connector 110, to the inlet of the string of connected fuel injectors 41. Fuel is thereby able to flow from the fuel source into the fuel injectors 41.

The fuel inlet connector 110 includes a fuel inlet fitting 111 and a metal snap ring 117 which, when the fuel inlet fitting is inserted into the opening in the shell 52, expands into a recess in it to resist removal of the fuel inlet fitting from the shell. A nylon fuel tube inlet fitting 113 connects the fuel inlet fitting 111 to the fuel tube 114. A lower O-ring 115 provides a seal between the fuel inlet fitting 111 and shell 52. An upper O-ring 116 provides a seal between the fuel inlet fitting 111 and fuel tube inlet fitting 113.

Figure 3:
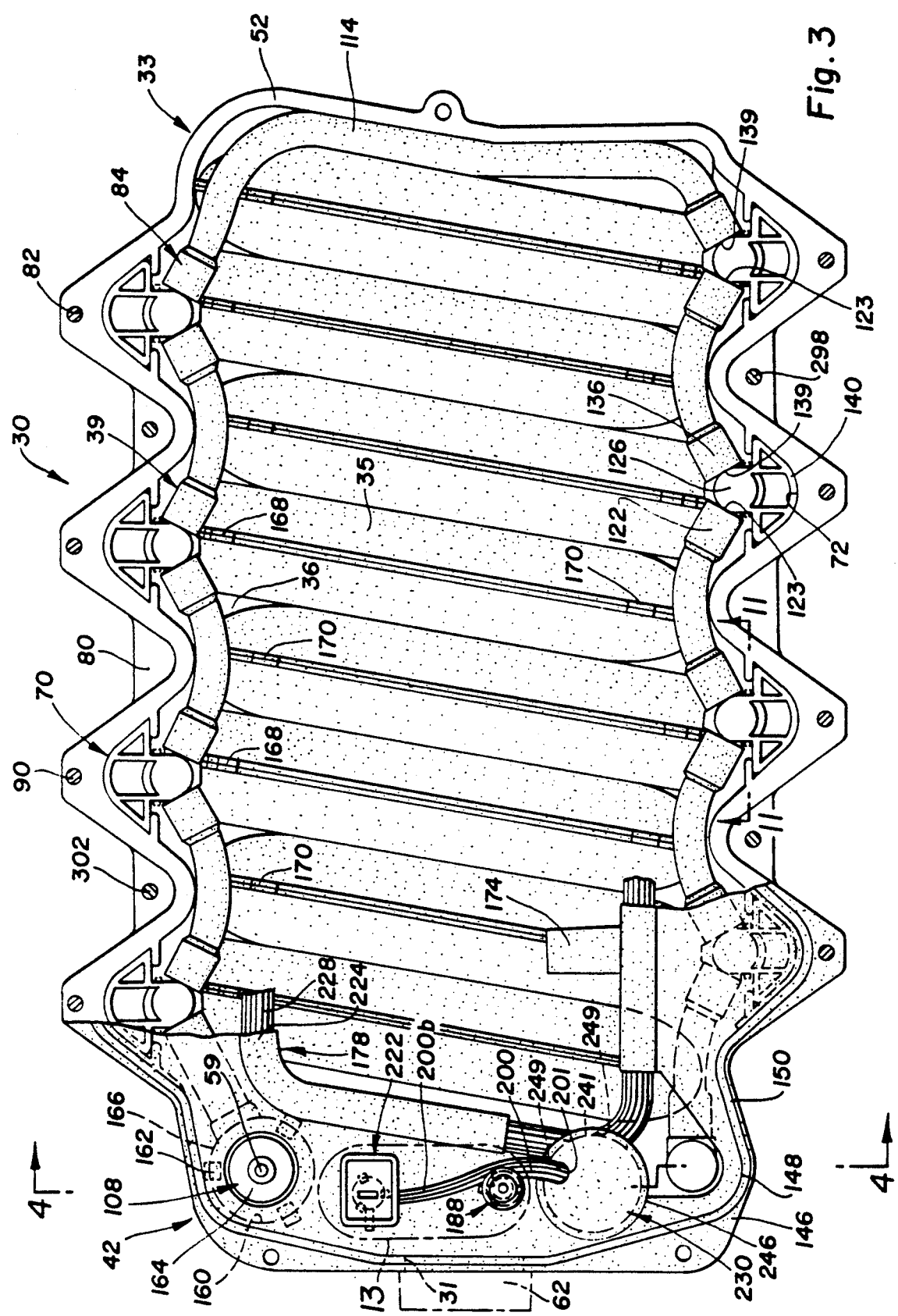
FIG. 3 is a plan view in the plane indicated by line 3—3 of FIG. 2 with the cover removed and part of the carrier being broken away showing some components in assembly.

As shown in FIGS. 3 and 4, the fuel distribution assembly 84 includes the fuel pressure regulator 108 having an inlet connected to the outlet of the string of connected fuel injectors 41. The fuel distribution assembly 84 may also include a connector having an O-ring for connecting the outlet of the string of connected fuel injectors 41 to the fuel pressure regulator 108.

The fuel distribution assembly 84 also includes a fuel outlet connector 131 which enables connection of the outlet of the fuel pressure regulator 108 to one end of a fuel outlet tube 112. The fuel outlet tube 112 extends outside the casing 33 through an opening in the shell 52. The other end of the fuel outlet tube 112 is connected to a fuel tank outside the casing 33. Fuel is thereby able to flow out of the string of connected fuel injectors 41, through the fuel pressure regulator 108 and the fuel outlet tube 112 to the fuel tank.

The fuel outlet connector 131 includes a fuel outlet fitting 132 and a metal snap ring 133 which, when the fuel outlet fitting is inserted into the opening in the shell 52, expands into a recess in it to resist removal of the fuel outlet fitting from the shell. Upper and lower O-rings 135, 137 provide seals between the fuel outlet fitting 132 and fuel pressure regulator 108, and the shell 52, respectively. The casing 33 may have additional ports for the attachment of connectors similar to the fuel inlet and outlet connectors 110, 131 to allow communication between the casing interior and components which require a vacuum source, such as power brakes.

Figure 11:
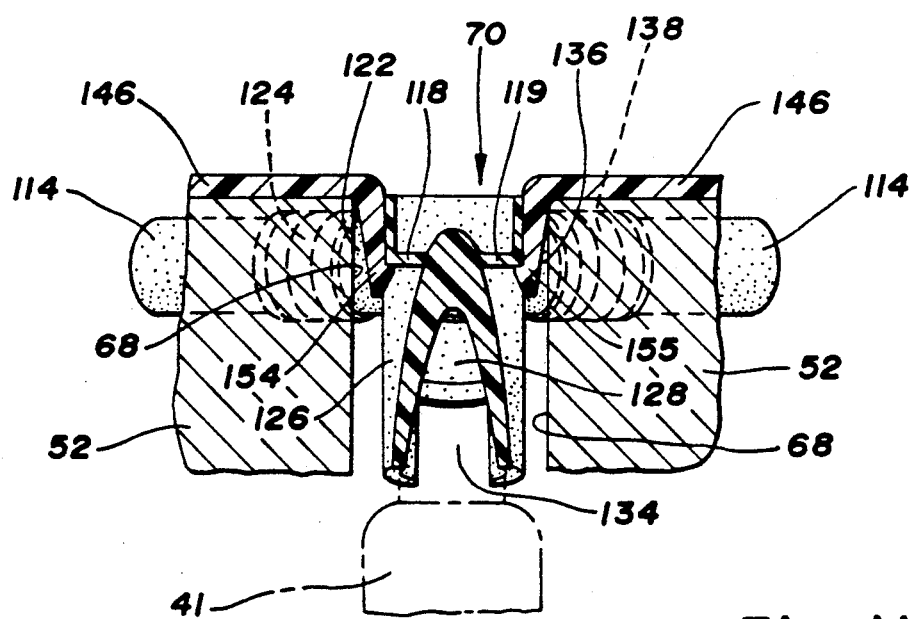
FIG. 11 is an enlarged cross-sectional view through an injector pod in the plane indicated by line 11—11 of FIG. 3.

Each injector pod 70, with a respective fuel injector 41 and fuel tubes 114 connected to it, is connected to the carrier 42 by inlet and outlet latches 154, 155 extending downward from the carrier, as shown in FIG. 11. Each inlet and outlet latch 154, 155 comprises a spring arm and a finger. The inlet and outlet latches 154, 155 are located on the carrier 42 so that, when an injector mounting 126 is inserted upward toward the carrier between the latches, the fingers are deflected away from the injector mounting by the respective inlet and outlet ledges 118, 119. When the injector mounting 126 reaches a point where the fingers of the respective latches 154, 155 are clear of the adjacent inlet and outlet ledges 118, 119, the fingers spring toward the injector mounting to positions below the respective ledges thereby holding the injector pod 70 to the carrier 42. The inlet latch 154 engages the inlet projection 122 and the outlet latch 155 engages the outlet projection 136 to prevent rotation of the injector pod 70 with respect to the carrier 42. The cross section of each injector seat 68 adjacent the respective inlet and outlet latches 154, 155, shown in FIG. 11, is sufficiently narrow to obstruct separation of the latches from the injector pod 70 when it is inserted into the injector seat.

The surfaces of each of the fingers on the inlet and outlet latches 154, 155 which engage the inlet and outlet ledges 118, 119, respectively, may be inclined upward toward the respective spring arms. This enables disconnection of the injector pod 70 from the carrier 42 by forcibly pulling the injector pod downward away from the carrier to cause the fingers on the inlet and outlet latches 154, 155 to move away from the injector mounting 126 to a point where the fingers are clear of the respective ledges 118, 119.

Carrier

As shown in FIGS. 1, 2, 3 and 4, the carrier 42 comprises a continuous flat base strip 146 disposed between the cover 54 and the casing flange 80. The base strip 146 is releasably connected to the interior of the casing 33 above the injector seats 68 by being clamped between the cover 54 and the casing flange 80, and by the injector pods 70. The base strip 146 may have alignment pins extending upward and downward from its upper and lower surfaces, respectively. The alignment pins are received in corresponding recesses in the cover 54 and casing flange 80 to align the base strip 146 with respect to them. The base strip 146 is constructed of short glass reinforced nylon type 66 to increase its compressive strength.

Each face of the base strip 146 has a peripheral carrier groove 148 along its entire length and a resilient carrier ribbon 150 contained within each carrier groove. The carrier ribbon 150 extends beyond the respective faces of the base strip 146 so that, when it is disposed between the cover 54 and casing flange 80, the carrier ribbon is compressed to provide a seal between the cover and casing flange. As shown in FIG. 7, ribbon connectors 152 comprising passages extend between the carrier grooves 148 throughout the base strip 146 to allow communication between the carrier grooves. The carrier ribbon 150 is placed in the carrier grooves 148 by injecting dimethylsilicone rubber in a liquid state into them on one face of the base strip 146 and allowing it to flow through the ribbon connectors 152 into the carrier groove on the opposite face. The carrier groove 148 on the lower face of the base strip 146 may also be connected with the cylindrical recesses in the extensions 174 to enable the ribbon material to flow into them to form the locator pads 172.

As shown in FIGS. 3 and 4, the base strip 146 has a circular component opening 160 adjacent the fuel outlet tube 112 and three equally spaced integral resilient curved clasps 162 extending into the opening. The fuel pressure regulator 108 has a cylindrical housing 164 which is sized so that it may be inserted into the component opening 160 without engaging the clasps 162. The regulator housing 164 has a cylindrical regulator flange 166 which, when the regulator housing is inserted upward into the component opening 160, is grasped by the clasps 162 to releasably retain the regulator housing in the component opening. The regulator housing 164 can be removed by pulling it downward out of the component opening 160 causing the clasps 162 to release the regulator flange 166. Components other than the fuel pressure regulator 108 may be held within an opening in the base strip 146 similar to the component opening 160 by clasps similar to the clasps 162.

Figure 13:
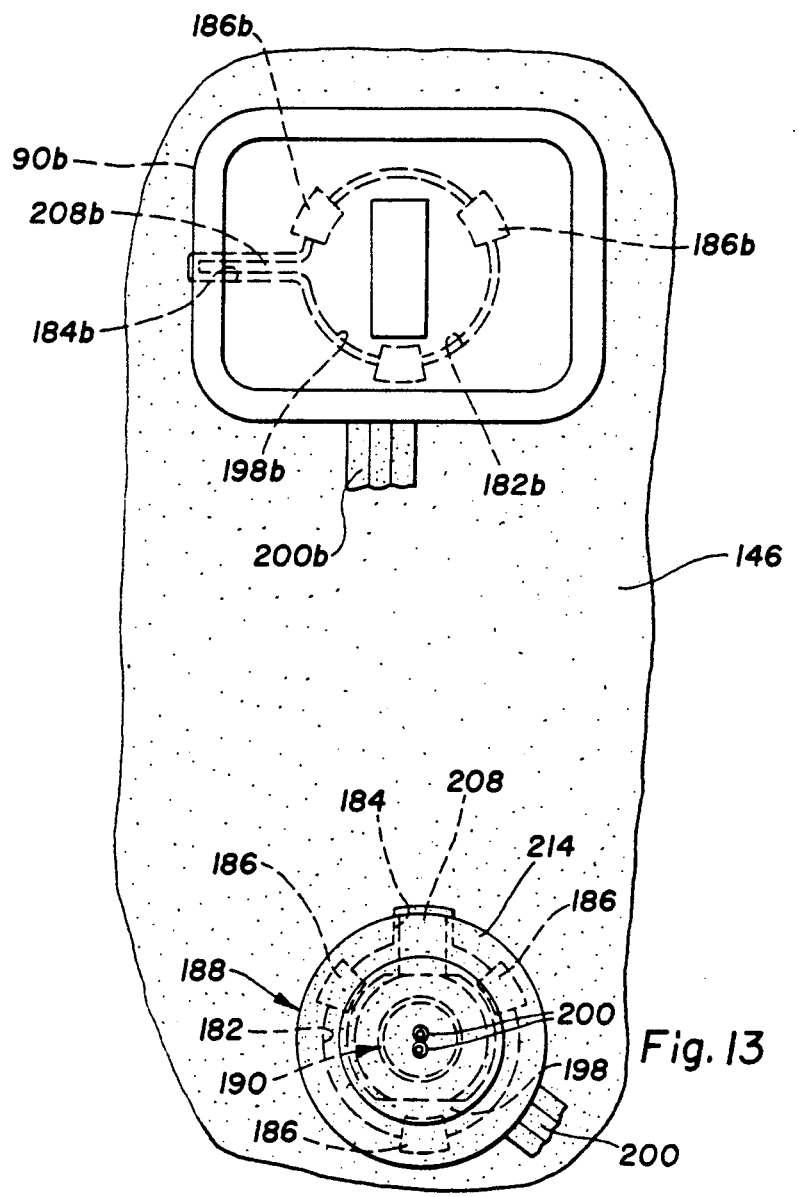
FIG. 13 is an enlarged view of circled portion 13 of FIG. 3 showing the connection between the temperature sensor, pressure sensor and carrier.

As shown in FIGS. 3, 4 and 13, the base strip 146 has a circular component opening 182 adjacent the air inlet 31 and a component keyway 184 contiguous with the component opening 182. Three equally spaced integral resilient detents 186 extend from the lower surface of the base strip 146 into the component opening 182 at an angle to the base strip.

Figure 14:
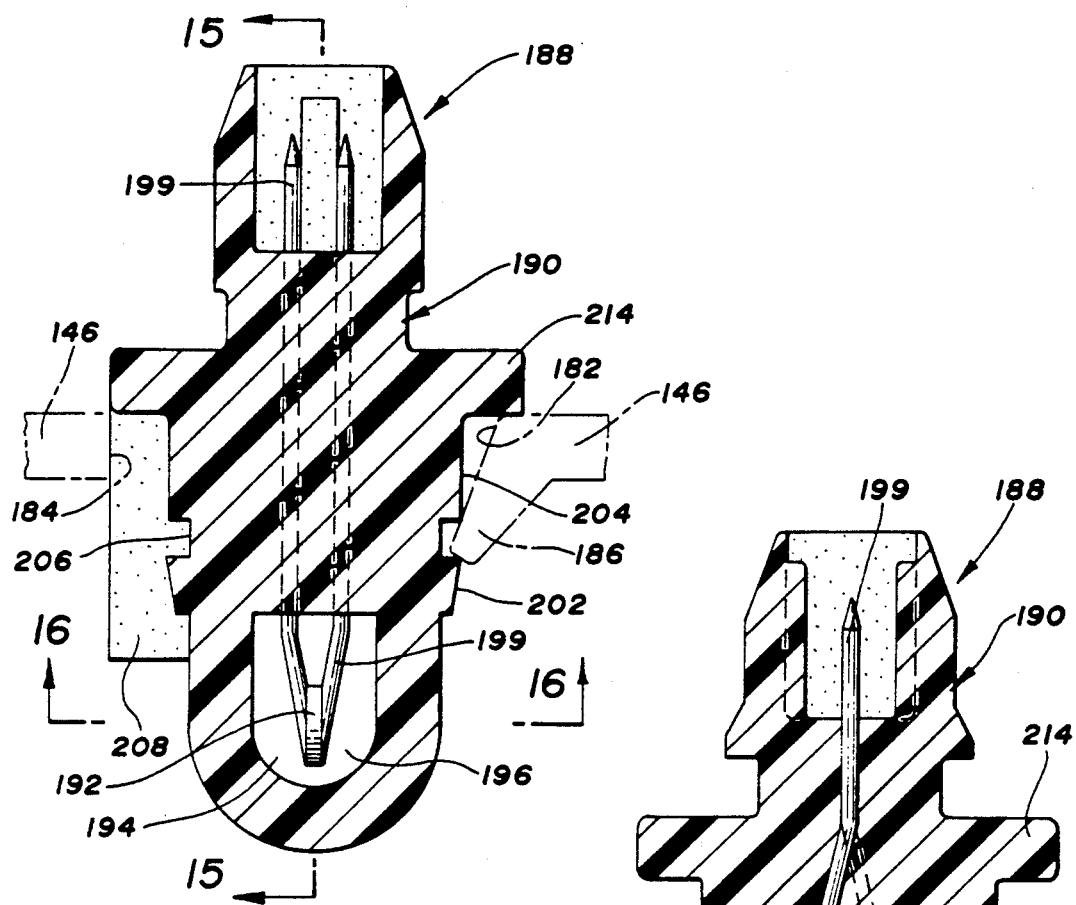
FIG. 14 is an enlarged view of the temperature sensor (in solid lines) and portions of the carrier (in phantom) contained within the circled portion 14 of FIG. 4.
Figure 15:
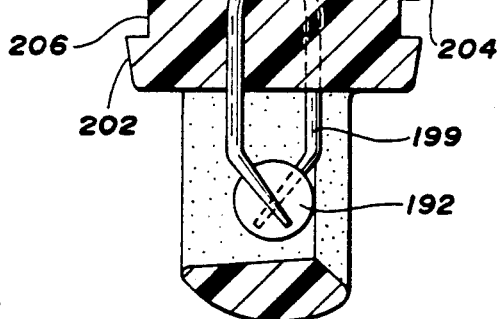
FIG. 15 is a cross-sectional view of the temperature sensor generally in the plane indicated by line 15—15 of FIG. 14.
Figure 16:
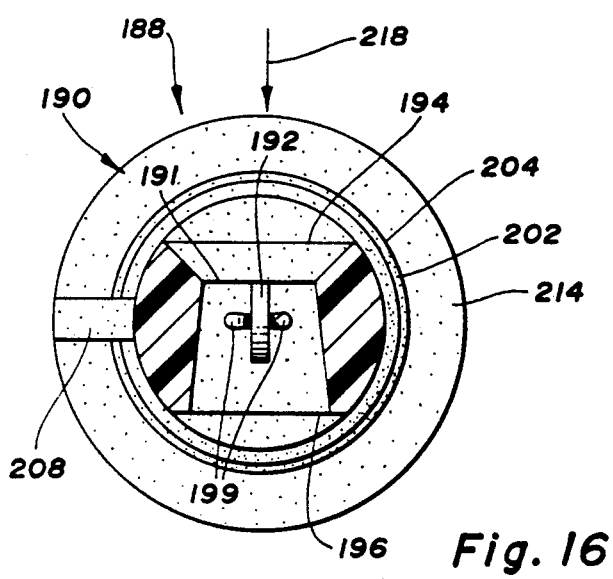
FIG. 16 is a cross-sectional view of the temperature sensor generally in the plane indicated by line 16—16 of FIG. 14.

A temperature sensor 188, shown in detail in FIGS. 14, 15 and 16 comprises a cylindrical sensor housing 190, extending downward through the component opening 182. The sensor housing 190 is constructed of glass filled polyester. A thermistor 192 which produces a non-linear variable electric resistance inversely proportional to its temperature is disposed within the sensor housing 190. The thermistor 192 may have a low weight to reduce its thermal inertia resulting in improved responsiveness of the thermistor.

The sensor housing 190 has a housing inlet 194 which faces the air inlet 31 so that a portion of the air entering the casing 33 through the air inlet flows through the housing inlet in the direction 218 into the sensor housing 190, as shown in FIG. 16. The air flows through a passageway in the sensor housing 190 and exits through a housing outlet 196. The passageway has a converging portion adjacent the housing inlet 194 and a diverging portion adjacent the housing outlet 196, with an edge 191 being formed between the converging and diverging portions. Passage of the air flow by the edge 191 results in the formation of vortices in the air flow downstream of the edge 191. The diverging portion produces an increase in the air flow velocity through the passageway adjacent the edge 191. The thermistor 192 is positioned in the passageway adjacent the edge 191 to maximize the velocity of the air flow adjacent the thermistor and to maximize the impingement of the vortices on the thermistor. The increased air flow turbulence produced by the vortices and the increased air flow velocity adjacent the thermistor 192 increases its responsiveness and accuracy. The velocity of the air entering the casing 33 through the air inlet 31 may be sufficiently high to further increase the velocity of the air in the passageway.

The top of the sensor housing 190 has an integral flange 214 which rests on the base strip 146. An electrical connector 198 is attached to the top of the sensor housing 190. Leads 199 are soldered to the thermistor 192 and extend through the sensor housing 190 into the electrical connector 198, as shown in FIG. 4. Sensor wires 200 of a wiring harness 230 extend from the leads 199 out of the electrical connector 198.

The lower end of the sensor housing 190 has a circular, approximately constant cross section which is smaller than the component opening 182 to allow downward insertion of the sensor housing into it. As shown in FIGS. 14, 15 and 16, the sensor housing 190 has a frustoconical portion 202 above the housing inlet and outlet 194, 196. The frustoconical portion 202 facilitates coaxial alignment of the sensor housing 190 with the component opening 182 as it is inserted downward into the component opening. The sensor housing 190 has a cylindrical enlarged portion 204 above the frustoconical portion 202 having a circular cross section smaller than the component opening 182 but sufficiently large to engage the resilient detents 186 when the sensor housing is inserted into the component opening. The enlarged portion 204 has a cylindrical recess 206 so that, when the enlarged portion is inserted into the component opening 182, the ends of the detents 186 enter the recess to releasably retain the sensor housing 190 in the component opening. The sensor housing 190 can be removed by pulling it upward out of the component opening 182 causing the ends of the detents 186 to exit the recess 206.

The sensor housing 190 has an integral longitudinal key 208 extending from its outer surface. When the sensor housing 190 is inserted into the component opening 182 with the housing inlet 194 facing the air inlet 31, the key 208 enters the component keyway 184 to prevent rotation of the sensor housing with respect to the base strip 146. The key 208 is located on the sensor housing 190 so that, when it is inserted into the keyway 184, the thermistor 192 is properly aligned with respect to the base strip 146.

An alternative embodiment of the sensor housing 190 is shown in FIGS. 17 and 18. The construction of the alternative sensor housing 190a and carrier 42a corresponds to the sensor housing 190 and carrier 42 except for the modifications described below. Similar parts are identified by the same reference numerals as those used for the temperature sensor 188 with the addition of the suffix a. The detents 186 and component keyway 184 are removed from the base strip 146a. A continuous ridge 212 is formed on the upper surface of the base strip 146a with the component opening 182a being offset inside the ridge.

The sensor housing 190a includes an integral support flange 214 having a perimeter which corresponds in shape to the inner edge of the ridge 212 so that, when the sensor housing is inserted into the component opening 182a with the housing inlet 194a facing the air inlet 31, the flange fits inside the ridge to align the sensor housing with respect to the base strip 146a. The enlarged portion 204a of the sensor housing 190a has a circular cross section larger than the component opening 182a and a cylindrical recess 206a with an inner dimension corresponding to the edge of the component opening. The base strip 146a or the enlarged portion 204a is resilient so that, when it is inserted into the component opening 182a, the edge of the component opening enters the recess 206a to fasten the sensor housing 190a to the base strip. The base strip 146a may have a cylindrical recess 216 adjacent the edge of the component opening 182a to facilitate deflection of the edge when the enlarged portion 204a is inserted into the component opening.

As shown in FIGS. 3, 4 and 13, the pressure sensor 222 includes a sensor element of the conventional type contained in a sensor housing 190b similar to that described above in connection with the temperature sensor 188, except that the upper portion of the sensor housing 190b above the base strip 146b has the shape of a rectangular prism. Similar parts are identified by the same reference numerals as those used for the temperature sensor 188 with the addition of the suffix b. The base strip 146b has a cylindrical component opening 182b and keyway 184b, and resilient detents 186b similar to those described above in connection with the temperature sensor 188. The sensor housing 190b is fastened to the base strip 146b by detents 186b which extend into a recess 206b in the sensor housing in a similar manner as the detents 186 in the sensor housing 190. Sensor wires 200b extend from the sensor housing 190b in a similar manner as the sensor wires 200 extend from the sensor housing 190.

An alternative sensor housing for the pressure sensor 222 similar to the alternative sensor housing 190a is also possible. Locating the pressure sensor 222 inside the casing 33 results in an increase in the responsiveness of the pressure sensor.

A sensor housing may also alternatively be inserted into a semicircular recess formed in an edge of a base strip similar to base strip 146. The recess is slightly smaller than the sensor housing and either the base strip or sensor housing is resilient to allow the sensor housing to be inserted into the recess and held in it. The sensor housing has indentations into which the edges of the recess enter to prevent upward or downward displacement of the sensor housing with respect to the base strip. The sensor housing also has a pair of longitudinal keys which engage the edge of the base strip when the sensor housing is inserted into the recess to prevent rotation of the sensor housing with respect to it. The keys are located on the sensor housing so that, when they engage the base strip, the sensor within the housing is properly aligned with respect to the base strip.

Sensors may also be alternatively mounted on a platform which is releasably connected to the upper surface of a base strip similar to the base strip 146 by resilient posts extending upward from it. The distance between the posts is less than the perimeter of the platform so that the platform may be placed opposite the base strip with the posts in engagement with the edges of the platform to retain it against the base strip. The base strip may have an opening opposite the platform to allow a projection from it which contains a sensor to extend below the base strip. This can allow the sensor, for example, to be positioned opposite the air inlet.

Other components may be held in housings similar to the sensor housings described above which are connected to respective base strips in the above described manners.

As shown in FIGS. 1, 2, 3 and 9, the conduit 178 comprises an integral channel 224 adjacent the inner edge of the base strip 146 Control wires 228 of the wiring harness 230 extend from each fuel injector 41 and are inserted into the channel 224 from underneath it. The control wires 228 extend through the channel 224 to a wiring harness housing 241 of the wiring harness 230.

Figure 9:
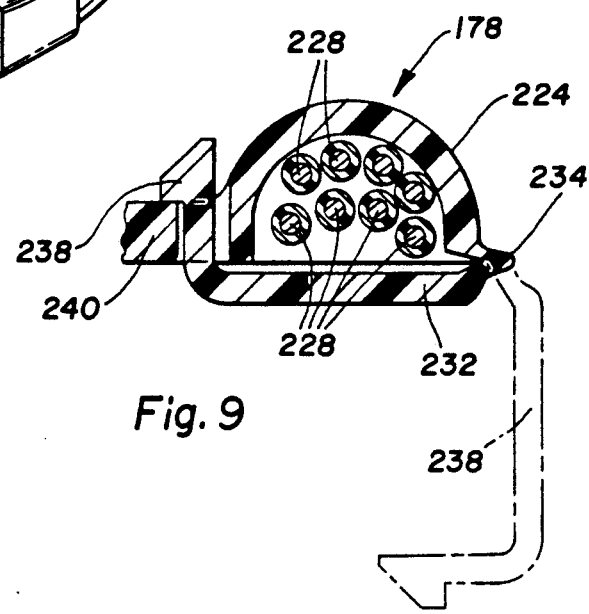
FIG. 9 is an enlarged view of circled portion 9 of FIG. 2 showing the conduit bridge in the closed position (in solid lanes) and in the open position (in phantom)

As shown in FIG. 1, the conduit 178 has a plurality of bridges 232 connected to the edge of the channel 224 by hinges 234. As shown in FIG. 9, each hinge 234 is formed by thin flexible webs connecting one end of the bridge 232 and the edge of the channel 224. As shown in FIG. 9, each bridge 232 is thereby able to swing between a closed position (shown in solid lines) wherein it extends across at least a portion of the channel 224 to obstruct removal of the control wires 228 from it and an open position (shown in phantom) wherein it extends away from the channel to enable insertion of the control wires into it.

Each bridge 232 has a pair of integral resilient latches 238 extending from its free end which releasably engage an integral keeper 240 formed in the channel 224 opposite the hinge 234. Each latch 238 comprises a resilient arm projecting upward into the keeper 240 from the end of each bridge 232 when the bridges are in the closed position and a finger projecting toward the keeper. The arrangement is such that when each bridge 232 is swung to the closed position, the latch 238 moves upward toward the keeper 240 causing the finger to engage it. Continued upward insertion of the latch 238 causes the finger to move away from the keeper 240, clear its inner edge and spring toward the keeper to a position above it. The bridge 232 is thereby retained in the closed position, as shown in FIG. 9. The bridges 232 are spaced apart from one another so that gaps between them are adjacent each fuel injector 41, as shown in FIG. 1. This enables the control wires 228 from the fuel injectors 41 to extend into the channel 224 with the bridges in the closed position.

The surfaces of each of the fingers on the latch 238 which engage the keeper 240 may be inclined downward toward the respective spring arm. This enables release of the bridge 232 from the closed position by forcibly pulling it downward to cause each of the fingers on the latch 238 to move away from the keeper 240 to a point where the fingers clear it.

An alternative conduit may be formed in the base strip 146 by a pair of conduit walls which extend upward from its upper face with the conduit walls being approximately parallel to the edges of the base strip. A conduit trough is defined by the area between the conduit walls into which the control wires are placed. Overhangs extend from the upper edges of portions of the conduit walls over the conduit trough to prevent removal of the control wires from it. Gaps are formed in the conduit walls adjacent the overhangs to facilitate insertion of the control wires into the conduit trough. The control wires are routed from the conduit trough to the respective injectors through openings in the base strip adjacent the base of the conduit trough.

As shown in FIGS. 1, 3 and 4, the wiring harness 230 includes a wiring harness housing 241 integral with the base strip 146 next to the air inlet 31. The wiring harness housing 241 is cylindrical and is inserted into an opening in the shell 52. The wiring harness housing 241 has notches 249 shown in FIGS. 3 and 4 adjacent its upper edge to allow the control wires 228 to extend into it from the interior of the casing 33. The interior of the wiring harness housing 241 has an integral cylindrical partition 245 with support ribs depending from its lower surface.

The wiring harness 230 includes a harness cap 246 shown in FIG. 1 connected to the wiring harness housing 241 by a harness hinge 248 The harness hinge 248 is formed by a thin flexible web connecting the edge of the harness cap 246 to the upper edge of the wiring harness housing 241. The harness cap 246 is thereby able to swing between an open position wherein each control wire 228 and sensor wire 200 may be inserted into the wiring harness housing 241 and a closed position. The harness cap 246 has a notch 201 allowing the sensor wires 200 to extend into the wiring harness housing 241 with the harness cap in the closed position.

The harness cap 246 has a plurality of integral latches 250 shown in FIGS. 1 and 4 which releasably engage a cylindrical ridge 252 on the inner surface of the wiring harness housing 241 when the harness cap is in the closed position, as shown in FIG. 4. Each latch 250 comprises a resilient arm projecting downward into the wiring harness housing 241 from the bottom of the harness cap 246 when the cap is in the closed position and a finger projecting radially outward. The arrangement is such that when the harness cap 246 is swung to the closed position, the latch 250 moves downwardly into the wiring harness housing 241 causing the finger to engage the ridge 252. Continued downward insertion of the latch 250 causes the finger to move inward, clear the ridge 252 and spring outward to a position below the ridge, thereby holding the harness cap 246 in the closed position. The harness cap 246 may be released from the closed position by forcibly pulling it upward to cause the finger of the latch 250 to move inward to a point where it clears the ridge 252.

The wiring harness 230 includes a cylindrical sealing body 242 constructed of absorbent silicone rubber impregnated with silicone fluid. The sealing body 242 is molded inside the wiring harness housing 241 on each side of the partition 245, as shown in FIG. 4, with the partition 245 providing support to the sealing body 242. The sealing body 242 extends downward out of the wiring harness housing and radially outward adjacent the opening in the shell 52. The sealing body 242 has cylindrical beads 243 on its outer surface which are compressed when the sealing body is inserted into the opening in the shell 52 to provide a seal between the sealing body and the shell.

Harness outlets 244 extend through the sealing body 242 and openings in the partition 245. The diameter of each harness outlet 244 is smaller than the respective sensor or control wire 200, 200b, 228 which extends through it. This enables the walls of the respective harness outlet 244 to compressively engage the respective sensor or control wire 200, 200b, 228 extending through it to provide a seal between them. The silicone fluid in the sealing body 242 facilitates insertion of the sensor and control wires 200, 200b, 228 into the respective harness outlets 244.

The sensor wires 200, 200b extend downward out of the wiring harness housing 241 and casing 33 to an engine control module. The engine control module measures the electric signals produced by the temperature and pressure sensors 188, 222 which can be correlated to the temperature and pressure, respectively, of the air entering the casing 24 through the air inlet 31. The electric signals produced by the temperature and pressure sensors 118, 222 also affect the regulation of the engine operation by the engine control module.

The control wires 228 extend downward out of the wiring harness housing 241 and casing 33 to the engine control module. The engine control module produces electric signals which cause the fuel injectors 41 to discharge fuel at predetermined times.

Alternatively, the wiring harness housing 241 and sealing body 242 may be replaced by a multiple wire connector. The sensor and control wires 200, 200b, 228 would then extend from inside the casing 33 to the multiple wire connector which would be sealingly retained in an opening in the casing in a similar manner as the wiring harness 230. A corresponding connector would be connected to the outer face of the multiple wire connector t o electrically connect each of the sensor and control wires 200, 200b, 228 to a corresponding wire outside the casing 33.

The carrier 42 described above, with some or all of the described components attached to it, may be used with other induction systems.

Distribution Mountings

A pair of distribution mountings 44 are disposed between the shell 52 and the cylinder heads 37, as shown in FIG. 2. Each distribution mounting 44, also shown in FIG. 19, comprises an elongate pedestal constructed of a thermoset material including a mineral reinforced phenolic material. The distribution mountings 44 reduce the heat transferred from the cylinder heads 37 to the casing 33 and the air, fuel and components contained in it.

The mounting passages 48 extend through each distribution mounting 44 between their respective upper and lower surfaces. Each mounting passage 48 connects a fluid outlet 32 to a respective cylinder inlet 34 to allow communication between the air tubes 35 and fuel injectors 41, and the respective cylinders.

Figure 19:
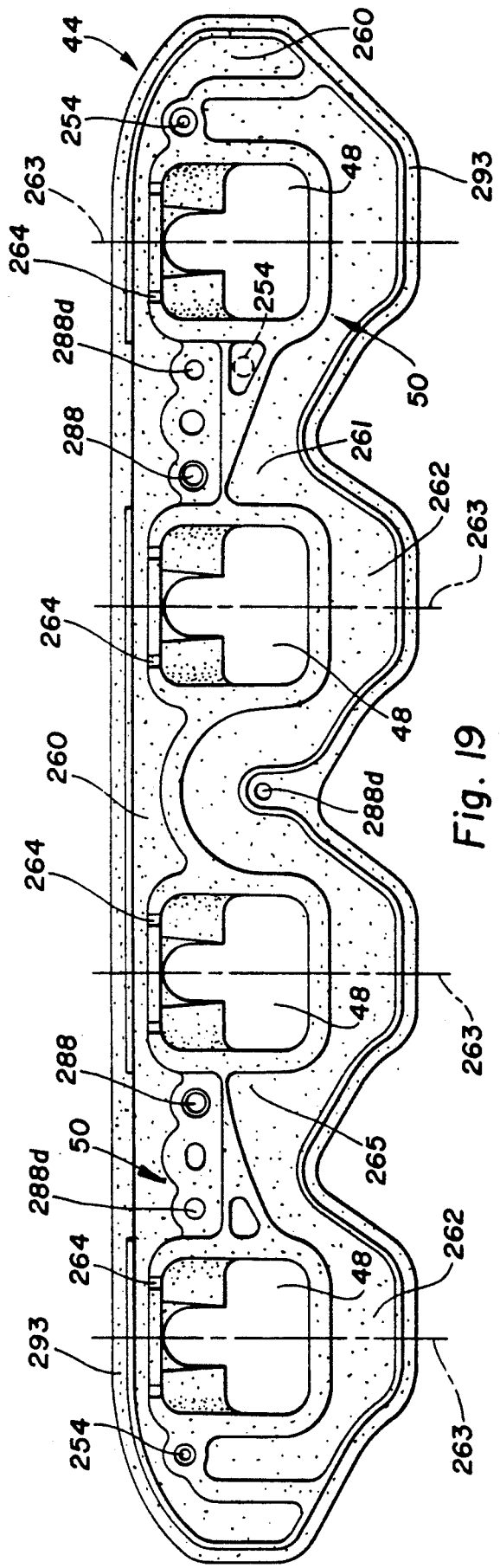
FIG. 19 is an enlarged bottom view of a distribution mounting in the plane indicated by line 19—19 of FIG. 2.

Each distribution mounting 44 has a pair of alignment pins 254 extending upward and downward from its top and bottom surfaces, respectively, as shown in FIGS. 1, 2 and 19. The portions of the shell 52 and cylinder heads 37 which mate with the distribution mountings 44 each have bores 256 corresponding to the alignment pins 254 so that, when the distribution mountings are clamped between the shell and cylinder heads, each alignment pin extends into a corresponding bore. Alignment of the shell 52, distribution mountings 44 and cylinder heads 37 is thereby facilitated.

The distribution passages 50 comprise an outer distribution passage 260 adjacent the outer side of each distribution mounting 44 and an inner distribution passage 262 adjacent the inner side of each distribution mounting. Each outer distribution passage 260 is defined by a longitudinal recess in the lower surface of the distribution mounting 44 as shown in FIG. 19. The recess has a longitudinal axis parallel to the lower surface of the distribution mounting 44 so that the recess is enclosed when the distribution mounting 44 mates with the adjacent cylinder head 37 shown in FIG. 21.

The distribution passages 50 include pairs of outer ports 264 which connect each outer distribution passage 260 to the adjacent mounting passages 48. Each outer port 264 is formed by a pair of outer transverse recesses in each distribution mounting 44 extending between an outer distribution passage 260 and the adjacent mounting passages 48. The transverse recesses are enclosed when each distribution mounting 44 mates with the respective cylinder head 37 to form the outer ports 264. Supplemental fluids are thereby able to flow from each outer distribution passage 260, through the outer ports 264 and into the adjacent mounting passages 48. The size of the cross section of the outer ports 264 can be varied to adjust the flow of supplemental fluids from the outer distribution passage 260 into the adjacent mounting passages 48.

Each pair of outer ports 264 are equally offset a sufficient distance from the transverse centerline 263 of the respective mounting passage 48, shown in FIG. 19, which coincides with the spray axes of the respective fuel injector 41. When each distribution mounting 44 mates with a respective cylinder head 37, the axes of the outer ports 264 thereby avoid intersecting the spray axes of the adjacent fuel injectors 41 to reduce any deflection of the fuel spray from the fuel injectors caused by the fluids exiting the outer ports. Moreover, the offset of the outer ports 264 facilitates the distribution of supplemental fluids to each intake port of a cylinder having multiple intake ports.

Each inner distribution passage 262 is defined by a longitudinal recess in the lower surface of the distribution mounting 44 shown in FIG. 19 and a corresponding longitudinal recess in the adjacent cylinder head 37 shown in FIG. 21. The inner recess in each distribution mounting 44 has a longitudinal axis parallel to the lower surface of the distribution mounting so that the inner recess and the corresponding recess in the respective cylinder head 37 are enclosed when the distribution mounting 44 mates with the cylinder head. The cross section of each inner distribution passage 262 varies along its length in the regions 261, 265 between the mounting passages 48.

The distribution passages 50 include inner ports 266 which connect each inner distribution passage 262 to the adjacent mounting passages 48. Each inner port 266 is similar to the outer ports 264 except that they are formed by transverse recesses in the cylinder heads 37 instead of in the distribution mountings 44. Supplemental fluids are thereby able to flow from each inner distribution passage 262 through the inner ports 266 into the adjacent mounting passages 48. The size of the cross section of the inner ports 266 can be varied to adjust the flow of supplemental fluids from the inner distribution passage 262 into the adjacent mounting passages 48. Only a single inner port 266 connects each inner distribution passage 262 to an adjacent mounting passage 48 since the gas flow through these ports initially mixes with the air exiting the air tubes 35 rather than the fuel exiting the fuel injectors 41.

Each cylinder head 37 has cylinder head passages 267a,b shown in FIG. 21 extending from a supplemental fluid source to its upper surface. Each of the cylinder head passages 267a,b is formed in the end of the cylinder head 37 closest to its source of supplemental fluid. A tubular connector 269 is fitted into cylinder head passage 267a to facilitate connection of the supplemental fluid source to this cylinder head passage.

Each of the cylinder head passages 267a,b communicates with a respective outer and inner distribution passage 260, 262 when the distribution mountings 44 mate with the respective cylinder heads 37. Supplemental fluids are thereby able to flow from the respective supplemental fluid sources through the outer and inner distribution passages 260, 262 and ports 264, 266 into the mounting passages 48.

The flow of the supplemental fluids through the regions 261, 265 results in the deposition of particulates from the supplemental fluids on the adjacent cylinder heads 37. In addition, the direction of the supplemental fluid flow through the inner distribution passages 262 results in the cross section of the regions 261 increasing in the direction of the supplemental fluid flow. This improves the flow efficiency of the supplemental fluids through the inner distribution passages 262.

The supplemental fluid source connected to the outer distribution passages 260 provides a source of crankcase gas to those distribution passages. The supplemental fluid source connected to the inner distribution passages 262 provides a source of reduced temperature exhaust gas to those distribution passages. Gases from each of these sources are thereby able to flow into the respective distribution passages 50 and into the mounting passages 48. Heating of the air and fuel exiting the fluid outlets 32 by the crankcase and exhaust gases prior to their entry into the cylinders is limited enabling greater amounts of air and fuel to enter the cylinders prior to combustion.

In addition to the source of crankcase gas, a fuel vapor cannister can be connected to the outer distribution passages 260 to additionally provide a source of fuel vapors to those distribution passages. Additional distribution passages can be formed in the distribution mountings 44 or the cylinder heads 37 similar to the distribution passages 50. Supplemental fluids can be connected to these additional distribution passages and thereby flow into the mounting passages 48.

Figure 22:
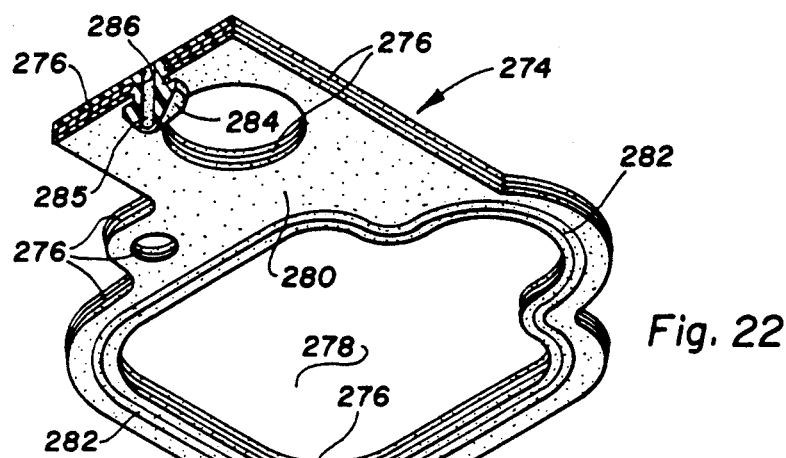
FIG. 22 is a perspective view showing a portion of an upper mounting gasket of FIG. 1.
Figure 24:
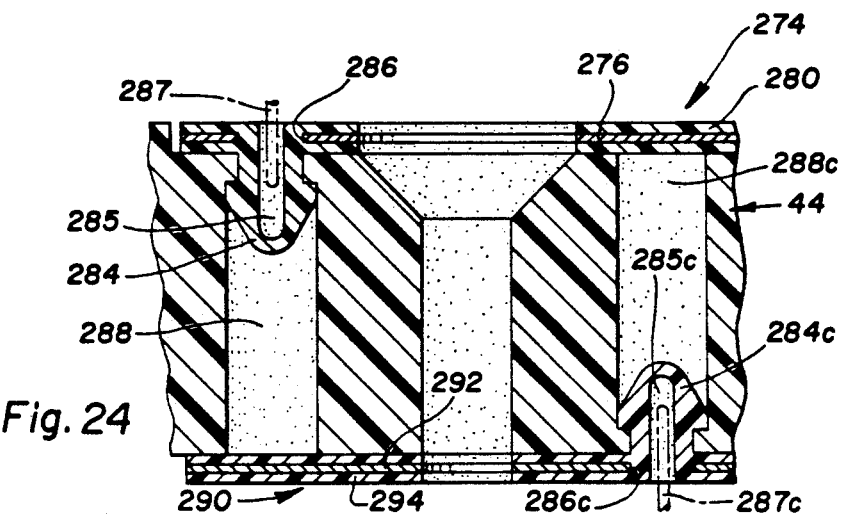
FIG. 24 is a portion of a longitudinal cross-sectional view of a distribution mounting of FIG. 1 showing the upper and lower mounting gaskets connected to it.

Each distribution mounting 44 has an upper mounting gasket 274 connected to its upper surface, as shown in FIGS. 22 and 24. Each upper mounting gasket 274 comprises a flat metal plate 276, which corresponds to the upper surface of a respective distribution mounting 44. The plate 276 is constructed of No. 1 tempered steel. The plate 276 has ports 278 which correspond to each mounting passage 48. The upper and lower surfaces of the plate 276 are covered with a silicone rubber layer 280 having a bead 282 adjacent the perimeter of each port 278.

Integral silicone rubber studs 284 extend downward from the silicone rubber layer 280 on the lower surface of the plate 276 adjacent each of its ends. Each stud 284 has an elongate stud recess 285 wIth each plate 276 having an attachment opening 286 concentric with a respective stud recess. A pin 287 is inserted through the attachment opening 286 into the stud recess 285 to urge the stud 284 into an elongate mounting recess 288 comprising a stepped bore in the distribution mounting 44 which has a smaller cross section than the stud, as shown in FIG. 24. Each upper mounting gasket 274 is thereby releasably held to a respective distribution mounting 44 prior to connection of the distribution mounting to the shell 52 to facilitate the correct positioning of the upper mounting gasket between the shell and distribution mounting. When an upper mounting gasket 274 is disposed between a respective distribution mounting 44 and the shell 52, the silicone rubber layers 280, including the beads 282, are compressed to provide a seal between them.

Figure 23:
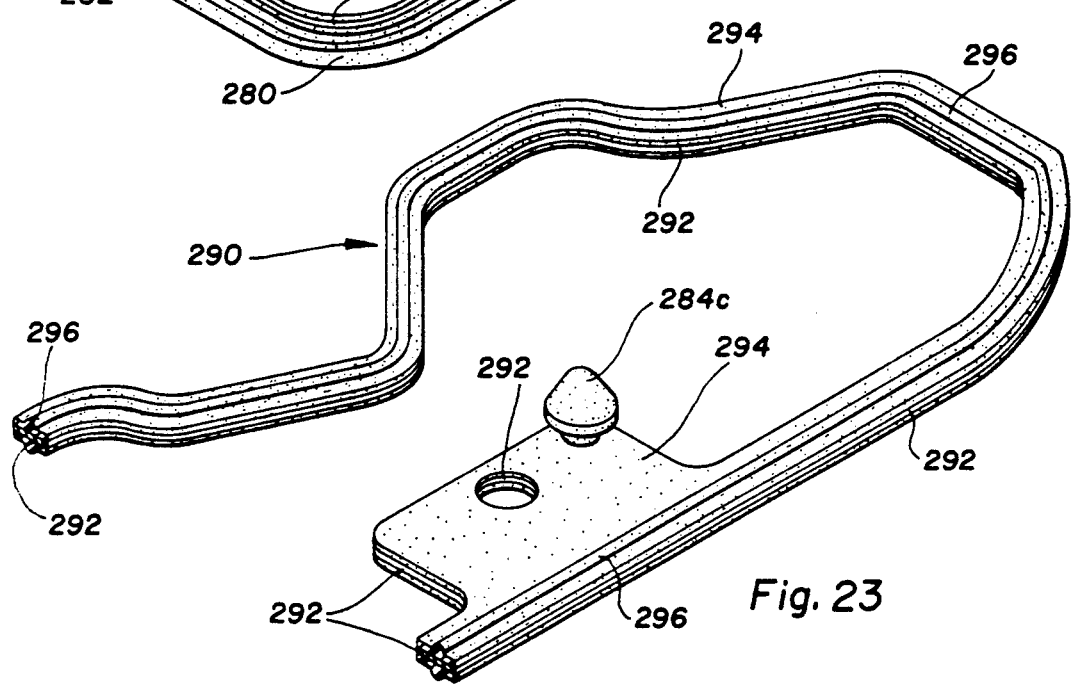
FIG. 23 is a perspective view showing a portion of a lower mounting gasket of FIG. 1.

Each distribution mounting 44 has a lower mounting gasket 290 connected to its lower surface, as shown in FIGS. 23 and 24. Each lower mounting gasket 290 comprises a flat metal strip 292 constructed of No. 1 tempered steel. The strip 292 is disposed in a notch 293 formed in the lower surface of the respective distribution mounting 44 adjacent its perimeter. The upper and lower surfaces of the strip 292 are covered with a silicone rubber layer 294 similar to the silicone rubber layers 280 on the upper mounting gasket 274. A bead 296 is formed in each silicone rubber layer 294.

Integral silicone rubber studs 284c similar to the silicone rubber studs 284 on the upper mounting gasket 274 extend upward from the silicone rubber layer 294 on the upper surface of the strip 292 adjacent each of its ends. Similar parts are identified by the same reference numerals as those used for the studs 284 with the addition of the suffix c. The lower mounting gasket 290 can thereby be releasably held to a respective distribution mounting 44 in a similar fashion as an upper mounting gasket 274. Disposition of a lower mounting gasket 290 between a respective distribution mounting 44 and cylinder head 37 results in compression of the silicone rubber layers 294, including the beads 296, to provide a seal between them.

An alternative to the connection of the upper and lower mounting gaskets 274, 290 to each distribution mounting 44 is the molding of a dimethylsilicone rubber mounting ribbon 272 on the upper and lower surfaces of a distribution mounting 44d similar in construction to the distribution mounting 44. The molding of such a mounting ribbon 272 on the lower surface of the distribution mounting 44d is shown in FIG. 20. Similar parts are identified by the same reference numerals as those used for the distribution mountings 44 with the addition of the suffix d. Each mounting ribbon 272 is molded in a respective mounting groove 268 formed in the surfaces of the distribution mounting 44e adjacent its perimeter. Each mounting ribbon 272 extends beyond the respective surfaces of the distribution mounting 44d so that, when it is disposed between the shell 52 and a respective cylinder head 37, the mounting ribbons 272 are compressed to provide a seal between them.

Threaded mounting bolts 298 shown in FIG. 2 extend through openings in the cover 54, casing flanges 80, upper mounting gaskets 274, distribution mountings 44 and lower mounting gaskets 290. The threaded end of each mounting bolt 298 is inserted into a bore in a respective cylinder head 37 having internal threads corresponding to the threads on the mounting bolt to secure the integrated induction system 30 to the cylinder heads.

A vane may be attached within each mounting passage 48, 48d adjacent each fuel injector 41 so that its fuel spray impinges on the respective vane to disperse the fuel to the separate intake ports of a cylinder having multiple intake ports. In addition, each such mounting passage 48, 48d may be shaped as a nozzle, with each distribution mounting 44, 44d having additional distribution passages to allow communication between an air source and each nozzle shaped mounting passage. By supplying air to each such mounting passage 48, 48d and properly shaping them, a sonic or supersonic air flow may be produced through each such mounting passage.

Each spark plug wire may be connected to a respective distribution mounting 44, 44d with an ignition energy source being located under the shell 52 between the distribution mountings. Electrical conductors can be integrally formed in the distribution mountings 44, 44d to electrically connect each spark plug wire to the ignition energy source.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An integrated induction system to provide fluids to the cylinders in an engine, comprising:
   a casing adapted for mounting on the engine, said casing having an air inlet and a plurality of fluid outlets, each of said fluid outlets being adapted to communicate with a respective cylinder;
   a plurality of air tubes disposed within said casing, said air tubes occupying a portion of the interior of said casing with the unoccupied portion of said casing constituting a plenum, said air tubes being positioned within said casing so that said plenum provides a flow path from said air inlet to said air tubes, one end of each of said air tubes opening from said plenum and the other end of each of said air tubes engaging said casing adjacent one of said fluid outlets to allow communication between said plenum and the cylinders so that air entering into said plenum through said air inlet is introduced via each of said air tubes into the respective cylinders; and
   a fuel injection assembly mounted within said casing to inject fuel into the air exiting said air tubes adjacent each of said fluid outlets causing a mixture of air and fuel to enter the respective cylinders.

2. An integrated induction system as set forth in claim 1 wherein said casing comprises an enclosure defined by a shell and a cover, said cover being removable to provide access to the interior of said shell.

3. An integrated induction system as set forth in claim 1 wherein said air inlet is located adjacent the top of said casing.

4. An integrated induction system as set forth in claim 1 wherein said casing is constructed of magnesium.

5. An integrated induction system as set forth in claim 1 wherein said air tubes are arranged so that their centers of curvature are approximately collinear resulting in the inner curves of said air tubes defining a cylindrical region constituting the principal portion of said plenum.

6. An integrated induction system as set forth in claim 1 wherein said fuel injection assembly comprises a fuel distribution assembly connected to a fuel source and a fuel injector corresponding to each fluid outlet, each of said fuel injectors being connected to said fuel distribution assembly to allow communication between the fuel source and said fuel injectors enabling said injection of fuel into the air.

7. An integrated induction system as set forth in claim 6 wherein at least a portion of said fuel distribution assembly is constructed of plastic.

8. An integrated induction system as set forth in claim 1 and further comprising a sensor disposed within said casing adjacent said air inlet.

9. An integrated induction system as set forth in claim 1 and further comprising a fuel pressure regulator disposed within said casing, said fuel pressure regulator having an inlet allowing communication between it and the interior of said casing.

10. A locator system for an air tube inside a manifold casing for introducing air contained within the manifold casing to a cylinder in an engine, said locator system comprising a locator tab projecting from the outer surface of the air tube, and a locator rib extending inward from the inner surface of the manifold casing toward said locator tab so that said locator rib bears upon said locator tab to hold the air tube in the manifold casing.

11. A locator system for an air tube inside a manifold casing for introducing air contained within the manifold casing to a cylinder in an engine, said locator system comprising a locator tab projecting outward from the outer surface of the air tube, and a locator sleeve formed on the inner surface of the manifold casing adjacent said locator tab so that said locator tab can be inserted in said locator sleeve, said locator tab and locator sleeve being adapted to interlock with one another to hold the air tube in the manifold casing.

12. A distribution mounting for a manifold in combination with an engine having a plurality of cylinders, said distribution mounting being disposed between the manifold adjacent its outlets and the engine adjacent the cylinder inlets, said distribution mounting having a plurality of mounting passages wherein each of said mounting passages leads from the manifold to a respective cylinder to allow communication between the interior of the manifold and the cylinders, said distribution mounting further having a distribution passage including ports leading to at least two of said mounting passages, said distribution passage being in further communication with a supplemental fluid source to allow communication, via said distribution passage, between the supplemental fluid source and at least two of said mounting passages.

13. A distribution mounting as set forth in claim 12 constructed of a thermoset material.

14. A distribution mounting as set forth in claim 12 wherein the cross section of said distribution passage varies along its length.

15. A distribution mounting as set forth in claim 14 wherein a portion of the cross section of said distribution passage increases along its length in the direction of the supplemental fluid flow through the distribution passage.

16. A distribution mounting for a manifold in combination with an engine having a plurality of cylinders, said distribution mounting being disposed between the manifold adjacent its outlets and the engine adjacent the cylinder inlets, said distribution mounting having mounting passages to allow communication between the interior of the manifold and the cylinders, and a distribution passage in communication with said mounting passages, said distribution passage being in further communication with a supplemental fluid source to allow communication between it and said mounting passages wherein said distribution passage comprises an elongate recess formed on the surface of said distribution mounting which mates with the engine, said recess having a longitudinal axis parallel to said surface of said distribution mounting which mates with the engines so that, when said distribution mounting mates with the engine, said recess is enclosed to form said distribution passage.

17. A distribution mounting as set forth in claim 12 and further comprising a resilient pedestal ribbon attached to the upper and lower surfaces of said distribution mounting adjacent its perimeter, said pedestal ribbons having thicknesses enabling them to extend beyond said upper and lower surfaces so that, when said distribution mounting is disposed between the manifold and the engine, said pedestal ribbons are compressed between said distribution mounting and the manifold and engine, respectively, to provide a seal between them.

18. A distribution mounting for a manifold in combination with an engine having a plurality of cylinders, said distribution mounting being disposed between the manifold adjacent its outlets and the engine adjacent the cylinder inlets, said distribution mounting having mounting passages to allow communication between the interior of the manifold and the cylinders, and a distribution passage in communication with said mounting passages, said distribution passage being in further communication with a supplemental fluid source to allow communication between it and said mounting passages, said distribution mounting including an elongate mounting recess in its upper surface and further comprising an upper mounting gasket having a resilient stud extending from its lower surface, at least a portion of said stud having a cross section larger than said mounting recess, said stud having an elongate stud recess, said upper mounting gasket having an attachment opening concentric with said stud recess enabling insertion of a pin into said stud recess to urge said stud into said mounting recess to hold said upper mounting gasket to said distribution mounting so that, when said distribution mounting mates with the manifold, said upper mounting gasket is disposed between the manifold and said distribution mounting to provide a seal between them.

19. A distribution mounting for a manifold in combination with an engine having a plurality of cylinders, said distribution mounting being disposed between the manifold adjacent its outlets and the engine adjacent the cylinder inlets, said distribution mounting having mounting passages to allow communication between the interior of the manifold and the cylinders, and a distribution passage in communication with said mounting passages, said distribution passage being in further communication with a supplemental fluid source to allow communication between it and said mounting passages, said distribution mounting including a elongate mounting recess in its lower surface and further comprising a lower mounting gasket having a resilient stud extending from its upper surface, at least a portion of said stud having a cross section larger than said pedestal recess, said stud having an elongate stud recess, said lower mounting gasket having an attachment opening concentric with said stud recess enabling insertion of a pin into said stud recess to urge said stud into said mounting recess to hold said lower mounting gasket to said distribution mounting so that, when said distribution mounting mates with the engine, said lower mounting gasket is disposed between said distribution mounting and the engine to provide a seal between them.

20. An integrated induction system to provide fluids to the cylinders in an engine, comprising:
- a casing adapted for mounting on the engine, said casing including a plurality of casing members held, together by connecting bolts extending through connecting bores in said casing members, said casing having an air inlet and a plurality of fluid outlets, each of said fluid outlets being adapted to communicate with a respective cylinder;
- a plurality of resilient spring clips fixed to each of said connecting bolts and engageable with one of said casing members to hold said casing members together when the pressure inside said casing is below a predetermined limit and to allow said casing members to separate when the pressure inside said casing reaches or exceeds said predetermined limit;
- a plurality of air tubes disposed within said casing, said air tubes occupying a portion of the interior of said casing with the unoccupied portion of said casing constituting a plenum, said air tubes being positioned within said casing so that said plenum provides a flow path from said air inlet to said air tubes, one end of each of said air tubes opening from said plenum and the other end of said air tubes engaging said casing adjacent a respective fluid outlet to allow communication between said plenum and the cylinders so that air entering into said plenum through said air inlet is introduced via each of said air tubes into the respective cylinders;
- a locator system including a locator tab projecting from the outer surface of each of said air tubes into engagement with said casing to hold said air tubes in said casing;
- a fuel injection assembly including a fuel distribution assembly connected to a fuel source, and a fuel injector corresponding to each fluid outlet, said fuel distribution assembly including an injector pod connected to each of said fuel injectors enabling communication between said fuel injectors and the fuel source, said injector pods being mounted on said casing so that each of said fuel injectors is adjacent one of said fluid outlets to facilitate injection of fuel into the air exiting said air tubes adjacent said fluid outlets to cause a mixture of air and fuel to enter the respective cylinders;
- a carrier connected to said fuel distribution assembly;
- a sensor connected to said carrier to measure the condition of the air inside said casing: and
- a distribution mounting disposed between said casing adjacent said fluid outlets, and the engine adjacent the cylinder inlets, said distribution mounting having passages to allow communication between air and fuel contained within said casing and the cylinders, and to allow communication between a supplemental fluid source and the cylinders.

* * * * *